(12) United States Patent
Ritz, Jr. et al.

(10) Patent No.: US 7,432,623 B2
(45) Date of Patent: Oct. 7, 2008

(54) BRUSHLESS ELECTROMECHANICAL MACHINE

(75) Inventors: Edward Failing Ritz, Jr., Portland, OR (US); John E. Bales, Brush Prairie, WA (US)

(73) Assignee: Apex Drives Laboratories, Inc., Portland, OR (US)

( * ) Notice: Subject to any disclaimer, the term of this patent is extended or adjusted under 35 U.S.C. 154(b) by 527 days.

(21) Appl. No.: 11/205,264

(22) Filed: Aug. 15, 2005

(65) Prior Publication Data

US 2006/0119215 A1 Jun. 8, 2006

Related U.S. Application Data

(63) Continuation-in-part of application No. 10/634,511, filed on Aug. 4, 2003, now Pat. No. 6,930,433, which is a continuation-in-part of application No. 10/417,713, filed on Apr. 16, 2003, now abandoned, which is a continuation of application No. 09/803,007, filed on Mar. 8, 2001, now Pat. No. 6,552,460.

(51) Int. Cl.
*H02K 1/22* (2006.01)

(52) U.S. Cl. .................. 310/156.36; 310/268; 310/112

(58) Field of Classification Search ............ 310/156.32, 310/156.36, 156.37, 156.35, 266, 268, 112
See application file for complete search history.

(56) References Cited

U.S. PATENT DOCUMENTS

| 2,993,159 | A * | 7/1961 | Devol | 318/400.39 |
| 2006/0022552 | A1 * | 2/2006 | Zhu et al. | 310/268 |

* cited by examiner

*Primary Examiner*—Dang D Le
(74) *Attorney, Agent, or Firm*—Silicon Forest Patent Group; Paul J. Fordenbacher, Esq

(57) ABSTRACT

An electromechanical machine having a stator and a rotor, the stator including at least one stator module of N toroid shaped electromagnets, the electromagnets arranged along an arc a predetermined distance apart defining a stator arc length. Each of the electromagnets has at least one gap. The rotor includes a disc adapted to pass through the at least one gap. The disc includes a plurality of permanent magnets spaced side by side about a periphery thereof and arranged so as to have alternating north-south polarities. The permanent magnets are sized and spaced such that within the stator arc length the ratio of permanent magnets to electromagnets is N+1 to N, where N is the number of electrical excitation phases applied to the electromagnets.

19 Claims, 21 Drawing Sheets

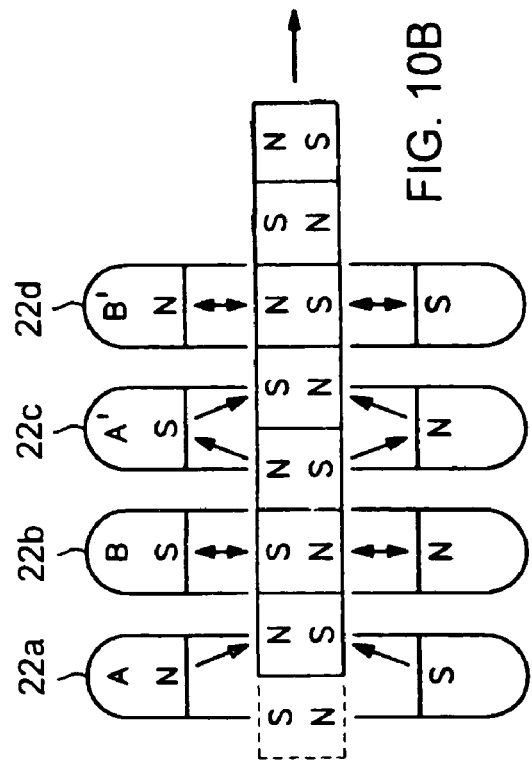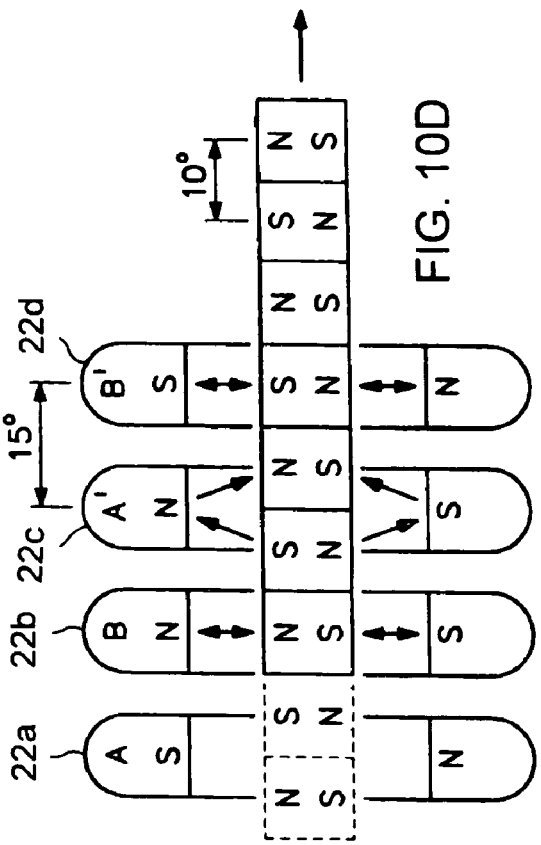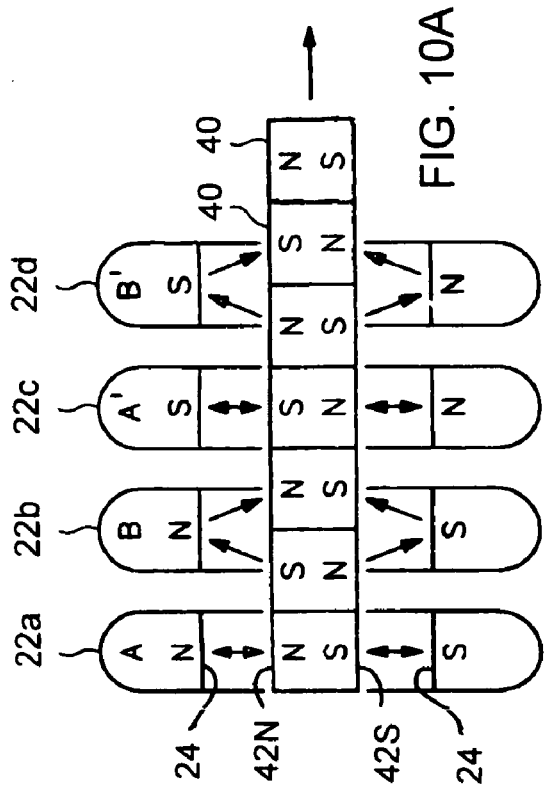

BRUSHLESS ELECTROMECHANICAL MACHINE

RELATED APPLICATIONS

This is a continuation-in-part application claiming benefit under 35 USC § 120 of U.S. Utility application Ser. No. 10/634,511, filed Aug. 4, 2003, now U.S. Pat. No. 6,930,433 and entitled BRUSHLESS ELECTRO-MECHANICAL DEVICE, which is in its entirety incorporated herewith by reference; claiming priority to continuation-in-part application Ser. No. 10/417,713, filed on Apr. 16, 2003 now abandoned, which is in its entirety incorporated herewith by reference; claiming priority to continuation application Ser. No. 09/803,007, filed on Mar. 8, 2001, now U.S. Pat. No. 6,552,460 which is in its entirety incorporated herewith by reference.

BACKGROUND

The following invention relates to brushless electromechanical machines for converting electrical energy into mechanical motion and vice-versa. More specifically, the invention relates to an electric motor/generator having self-starting capabilities, high torque and increased efficiency.

Electric motors employing brushes are characterized by low efficiency and require elaborate starter mechanisms. Recently, a type of brushless motor has been developed which employs an electromagnet having a stator comprised of a plurality of toroidal pole pieces. The pole pieces each have a narrow gap to permit the passage of a disk shaped rotor. The rotor includes a plurality of permanent magnets spaced about the periphery of the disk. As the permanent magnets pass through the gap in the stator poles, the permanent magnets are attracted and repulsed to move the rotor. With appropriate switching circuitry, this combination can be made to function as a brushless electric motor. An example of such construction is shown in Porter U.S. Pat. No. 5,179,307.

A problem with the motor of the '307 patent is that the motor requires some type of auxiliary starter mechanism in order to begin rotation of the disk. Additionally, this motor cannot easily reverse its direction.

What is needed in the art are rotary and linear electromagnetic machines that provide higher torque and power density for a given size and weight, lower losses for higher efficiency, and do not require an auxiliary starter mechanism, that is, are self starting.

BRIEF DESCRIPTION OF THE DRAWINGS

Like reference numbers generally indicate corresponding elements in the figures.

FIGS. 10A-10D is a schematic diagram of toroidal electromagnets and permanent magnets illustrating the two-phase switching characteristics of the drive electronics of FIG. 8, in accordance with an embodiment of the invention;

DETAILED DESCRIPTION

Figure 1:
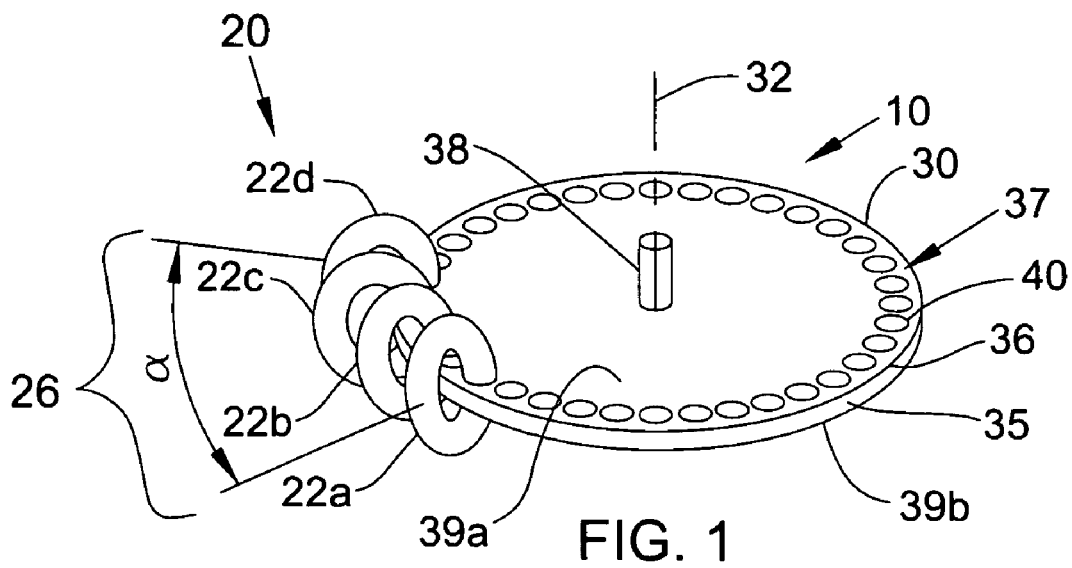
FIG. 1 is a perspective view of an electromechanical machine, in accordance with an embodiment of the invention.

In the following detailed description, reference is made to the accompanying drawings, which are not necessarily to scale, which form a part hereof, and in which is shown by way of illustration specific embodiments in which the apparatus and methods can be practiced. These embodiments are described in sufficient detail to enable those skilled in the art to practice them, and it is to be understood that the embodiments can be combined, or that other embodiments can be utilized and that procedural changes can be made without departing from the spirit and scope of the present invention. The following detailed description is, therefore, not to be taken in a limiting sense, and the scope is defined by the appended claims and their equivalents. In the drawings, like numerals describe substantially similar components throughout the several views.

The present invention provides for apparatus and methods for an electromechanical device, such as, but not limited to, a motor and a generator. A number of embodiments will be described that can be utilized individually and in combination.

Figure 2:
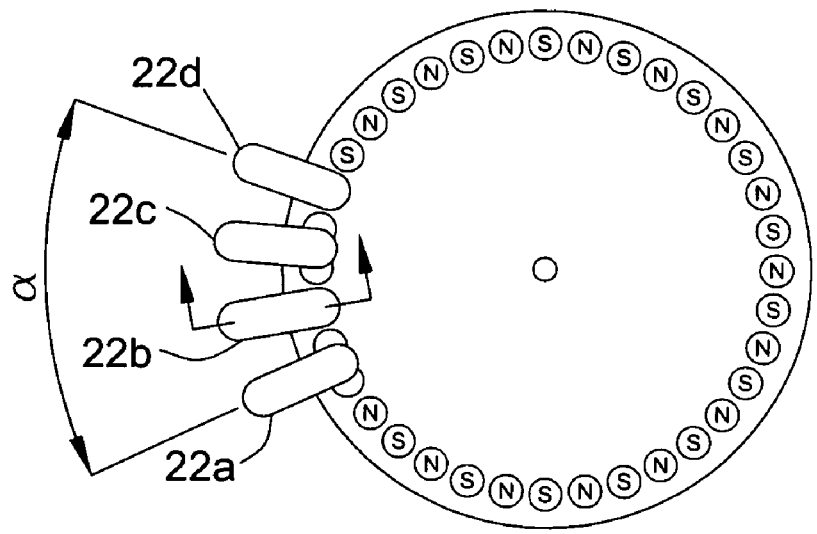
FIG. 2 is a top view of the electromechanical machine of FIG. 1.
Figure 3:
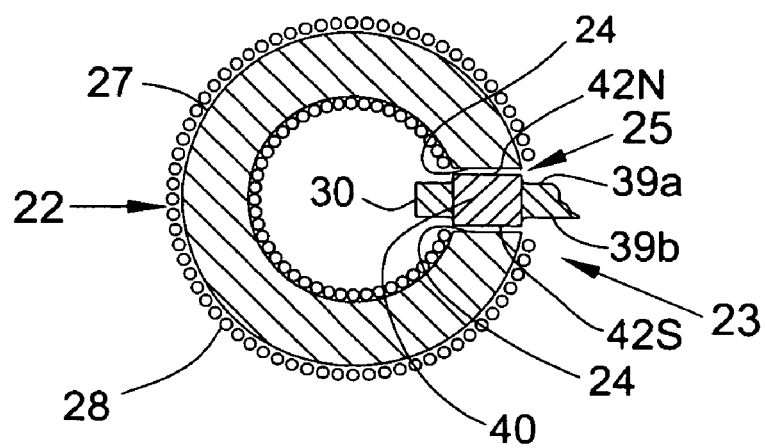
FIG. 3 is a side cross-sectional view of the electromechanical machine of FIG. 2 taken along line 3-3.

FIGS. 1 and 2 are perspective and top views of an electromechanical machine 10, in accordance with an embodiment of the invention. FIG. 3 is a cross-sectional view of the electromechanical machine 10 along cut line 3-3. The electromechanical machine 10 comprises a stator 20, a rotor 30, and a shaft 38. The electrical connections of the stator 20 are not shown for clarity. The stator 20 comprises four single-gap electromagnets 22 defining a stator group 26. The electromagnets 22 are arranged along and define a stator arc length .alpha. having a predetermined length. The number of electromagnets 22 and their arrangement relative to the rotor 30 are predetermined for a particular purpose, which will be explained below.

The single-gap electromagnet 22 comprises a single-gap core 27 and a winding 28. The single-gap core 27 defines a discontinuous toroid defining a gap 23 having two opposing gap faces 24 spaced apart a predetermined distance adapted to allow the rotor 30 to pass through. The single-gap core 27 comprises a magnetic material, that is, a material that has a relatively high magnetic permeability and a narrow hysteresis loop. Suitable core materials are known in the art, such as, but not limited to, silicon iron. The winding 28 comprises an insulated electrical conductor, such as, but not limited to, a wire, that is wrapped about the single-gap core 27 in a predetermined arrangement. A current passing through the winding 28 causes an electromagnetic flux field, also referred to as magnetic flux, within the single-gap core 27, wherein one gap face 24 is provided with a north polarity and the other gap face 24 is provided with a south polarity. The north and south polarity of the gap faces 24 can be switched by switching the direction of current within the winding 28. Toroidal electromagnets are self-shielding since the magnetic flux is substantially confined within the core. Toroidal electromagnets are also economical of material since the entire core material is utilized, in contrast with conventional motors. Other similar flux confining core configurations can be used and are anticipated, some of which are explained below.

The rotor 30, in this embodiment a disk rotor, comprises a disk 36 that supports a plurality of permanent magnets 40 there through. The disk 36 defines a disk first side 39a and a disk second side 39b. The disk 36 defines a rotation axis 32 perpendicular to the disk first and second sides 39a, 39b. The rotor 30 further comprises a shaft 38 coaxial with the rotation axis 32. The disk 36 also defines a disk periphery 37 adjacent to a disk edge 35.

The rotor 30 comprises an even number of a plurality of permanent magnets 40 (PMs). The PMs 40 of the present embodiment have a cylindrical bar shape that defines two PM faces 42, a north face 42N having a north magnetic polarity and a south face 42S having a south magnetic polarity. The PMs 40 extend through the disk 36 such that the disk first and second sides 39a, 19b are adjacent to either the north or south faces 42N, 42S. The PMs 40 are carried by the disk 32 about a ring that is coaxial with the rotation axis 32 about the disk periphery 37. The PMs 40 are arranged on the disk 36 wherein adjacent PMs 40 have opposite polarity; such that where a PM 40 has a north face 42N adjacent the disk first side 39a, an adjacent PM 40 will have a south face 42S adjacent the disk first side 39a, and so forth in alternating relationship.

Each of the electromagnets 22 are arranged with the gap 23 aligned with the rotor 30 so as to permit the PMs 40 to pass through the gap 23. The space defined by one of the gap faces 24 and the north or south face 42N, 42S defines a clearance gap 25. In general, the clearance gap 25 should be made as small as practical taking into consideration manufacturing tolerances and magnetic design requirements.

During operation, the electromagnets 22 are electronically switched in polarity to attract and then repel the appropriate permanent magnets 40 in the rotor 30, in a process that is described below. This attraction and repulsion is used to cause a rotational torque to the rotor 30 and therefore rotate the shaft 32 which can be utilized for a useful purpose. Mentioned here by way of introduction, but in more detail below, a stator group 26 having four electromagnets 22 can be operated as either a two-phase or four-phase electromechanical machine. The relative spacings of the electromagnets 22 and the PMs 40 determine whether the electromechanical machine will operate as either a two-phase or a four-phase electromechanical machine. As will be explained below, the electromechanical machine 10, as shown in FIGS. 1-3, operates as a two-phase electromechanical machine.

Figure 4:
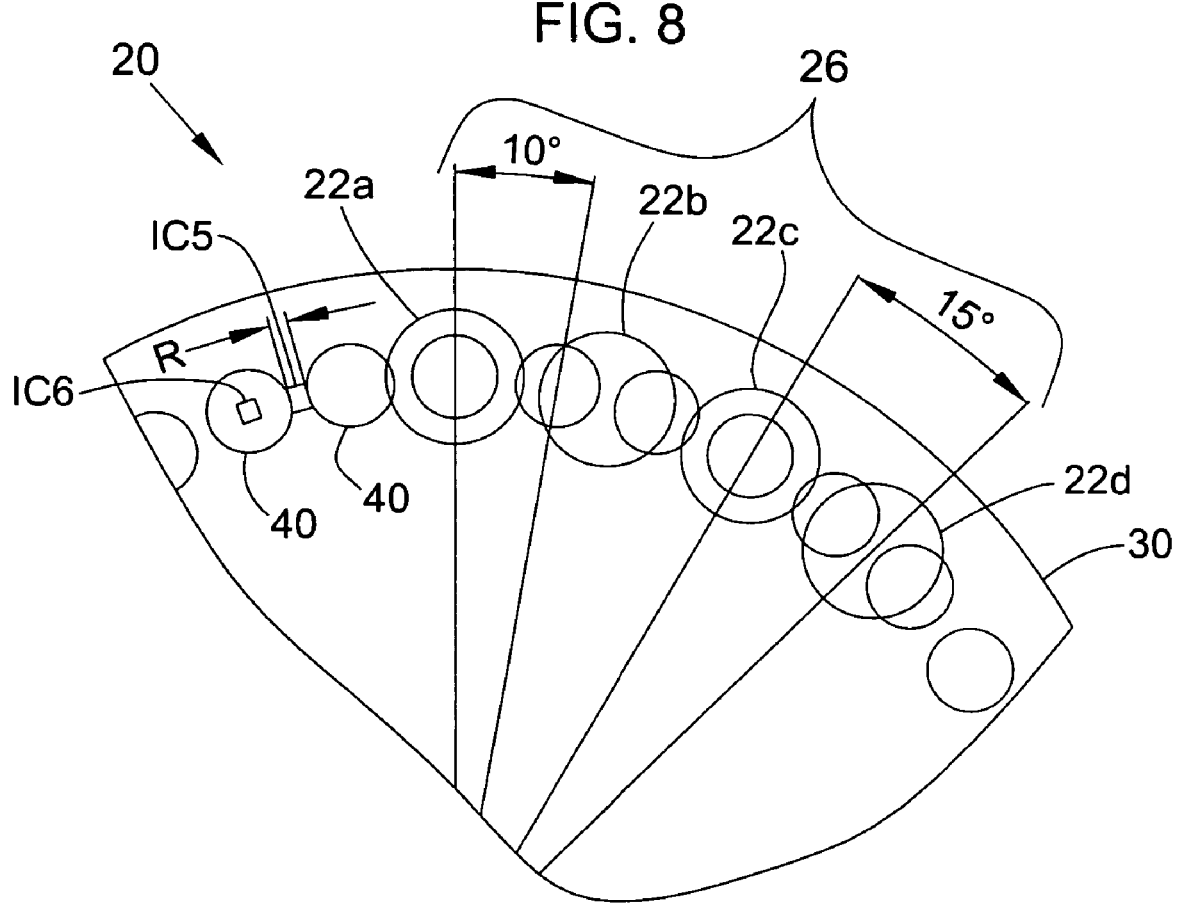
FIG. 4 is a top view of a portion of the rotor with the outline of the electromagnets superimposed thereon showing the relative positioning of the electromagnets to permanent magnets of a two-phase electromechanical machine, in accordance with an embodiment of the present invention.

FIG. 4 is a top view of a portion of the rotor 30 with the outline of the electromagnets 22 superimposed thereon showing the relative spacing of the electromagnets 22 to PMs 40, in accordance with an embodiment of the present invention. The PMs 40 are sized and spaced so that within the stator arc length alpha., the ratio of permanent magnets 40 to electromagnets 22 is 6 to 4. In an embodiment, the PMs 40 are as closely spaced as practical, having a space between each adjacent magnets 40 that does not exceed 10% of the diameter of the PM face 42.

Figure 5:
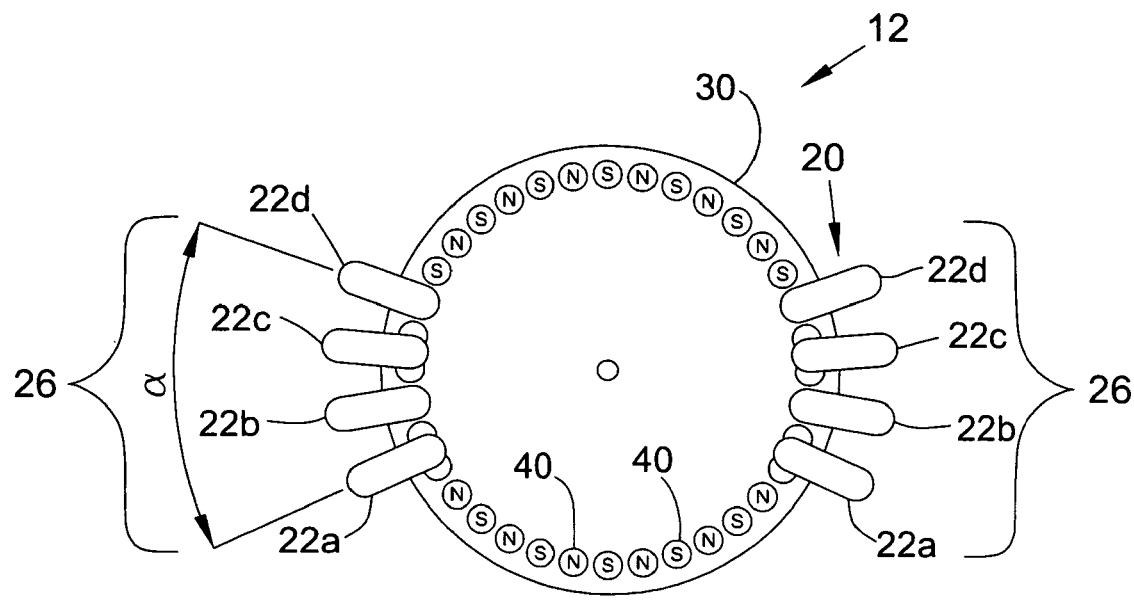
FIG. 5 is a top view of another electromechanical machine, in accordance with an embodiment of the invention.

FIG. 5 is a top view of another electromechanical machine 12 in accordance with an embodiment of the invention. The electromechanical machine 12 comprises two stator groups 26a, 26b. Each stator group 26a, 26b comprises four electromagnets 22. In other embodiments of an electromechanical machine, a predetermined number of stator groups 26 are used suitable for a particular purpose. In the embodiment of FIGS. 1 and 2, there are thirty-six PMs 40. Therefore, up to six stator groups 26, each having four electromagnets 22, may be used for the electromechanical machine 10 in accordance with the present invention.

Figure 6:
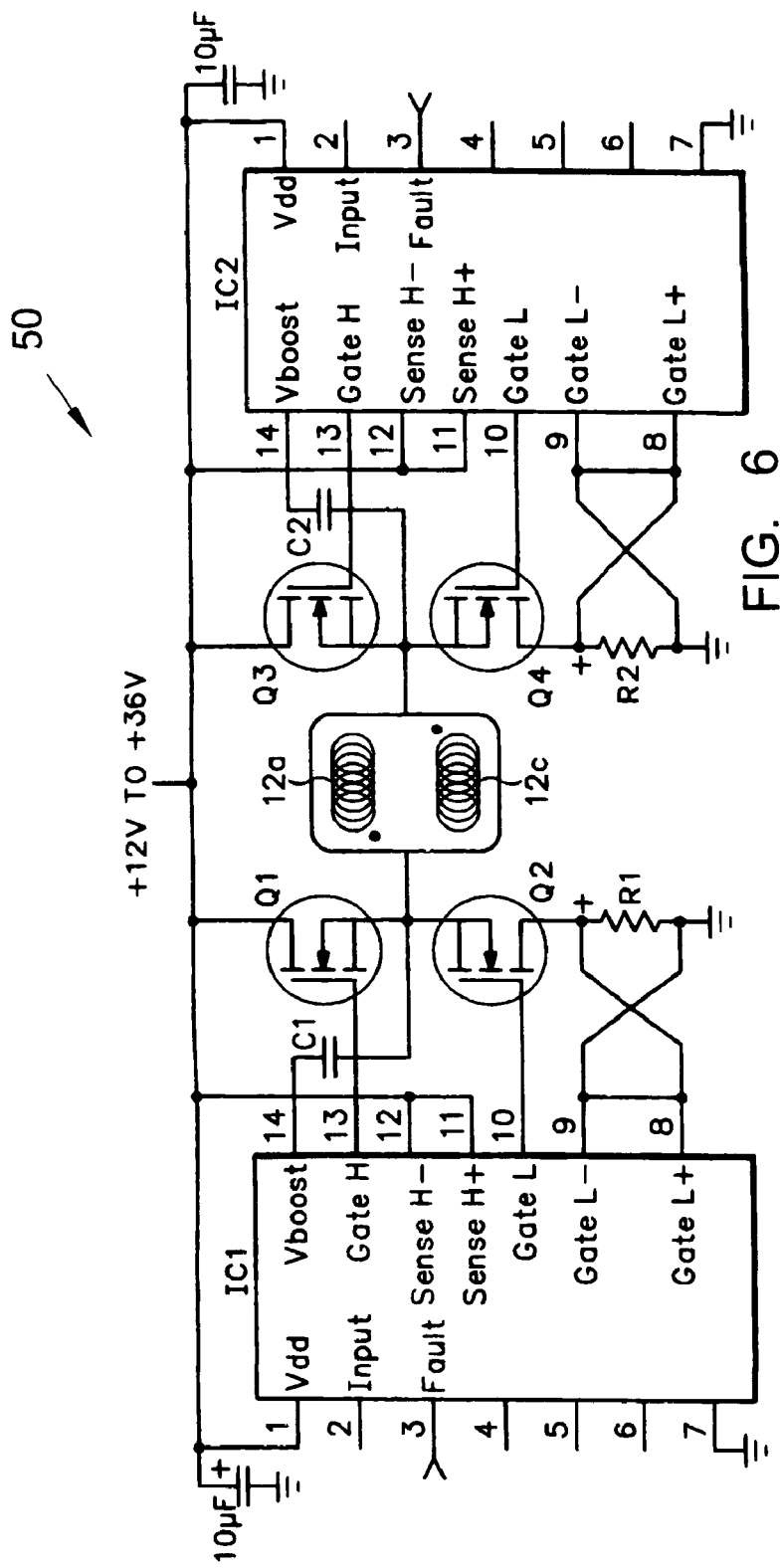
FIG. 6 is a schematic diagram of a drive module for controlling an electromechanical machine as an electric motor, in accordance with an embodiment of the invention.

FIG. 6 is a schematic diagram of drive electronics 50 suitable as a motor control for a two-phase embodiment of an electromechanical machine 10 having a stator group 26 having four electromagnets 22. The drive electronics 50 comprises a pair of integrated circuits IC1 and IC2 adapted to be coupled to two electromagnets, such as first and third electromagnets 22a, 22c, as shown in FIG. 1. It will be appreciated that identical drive electronics 50 is suitable to be used to drive the second and fourth electromagnets 22b, 22d. The ICs, IC1 and IC2, have output gates coupled to transistors Q1, Q2, Q3 and Q4 respectively.

Figure 7:
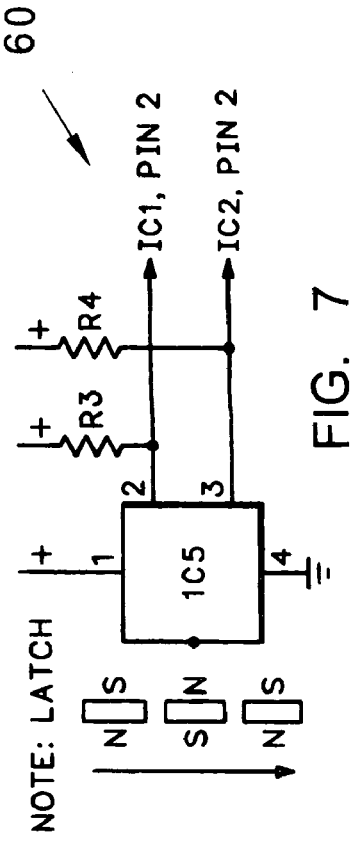
FIG. 7 is a schematic diagram of a Hall-effect sensor used in connection with the electronic drive module of FIG. 6, in accordance with an embodiment of the invention.

FIG. 7 is a schematic diagram of sensing electronics 60 suitable for providing an input signal to the drive electronics 50 of FIG. 6, wherein IC1 and IC2 are half bridge MOSFET drivers which are triggered by a Hall-effect sensor IC5, in accordance with an embodiment of the present invention. The Hall-effect sensor IC5 has its outputs coupled to the inputs of IC1 and IC2, respectively. The output of Hall-effect sensor IC5, pin 2, is coupled to the input of IC1. Similarly, output of Hall-effect sensor IC5, pin 3, is coupled to input of IC2. There is another Hall-effect sensor (not shown) for the second and fourth electromagnets 22b, 22d which operates substantially the same way but which is positioned so as to generate its signal at an electrical phase angle which lags the signal from IC5.

Figure 8:
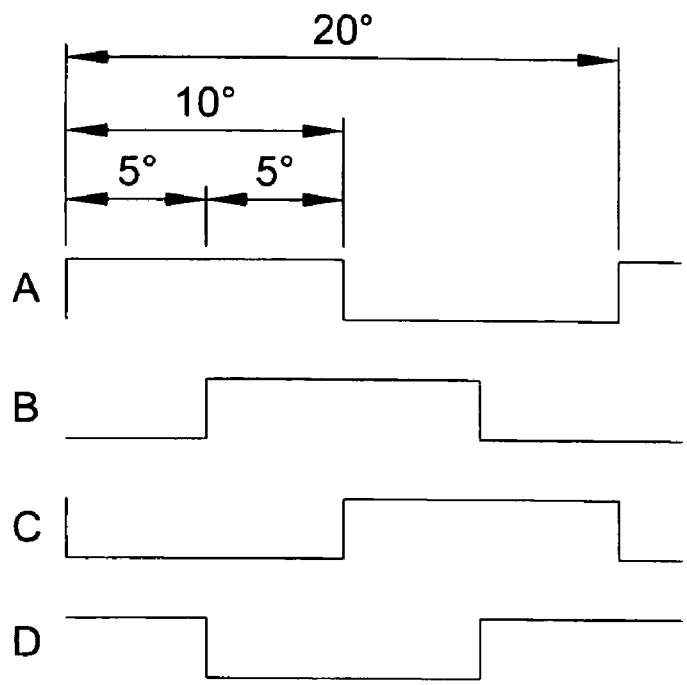
FIG. 8 is a timing diagram illustrating the switching characteristics of the electronic drive electronics of FIG. 6, in accordance with an embodiment of the invention.

FIG. 8 is a four-commutation interval timing diagram that repeats for every 20 degrees of rotation of the rotor 30, in accordance with an embodiment of a method of operating the drive electronics 50. The PMs 40 are spaced 10 degrees apart while the electromagnets 22 are spaced 15 degrees apart. The first and third electromagnets 22a, 22c are energized 180 electrical degrees out-of-phase with each other, and the second and forth electromagnets 22b, 22d are energized 180 electrical degrees out of phase. The first and second electromagnets 22a, 22b are energized 90 electrical degrees out-of-phase with each other, and the third and fourth electromagnets 22c, 22d are energized 90 electrical degrees out-of-phase with each other.

Figure 9:
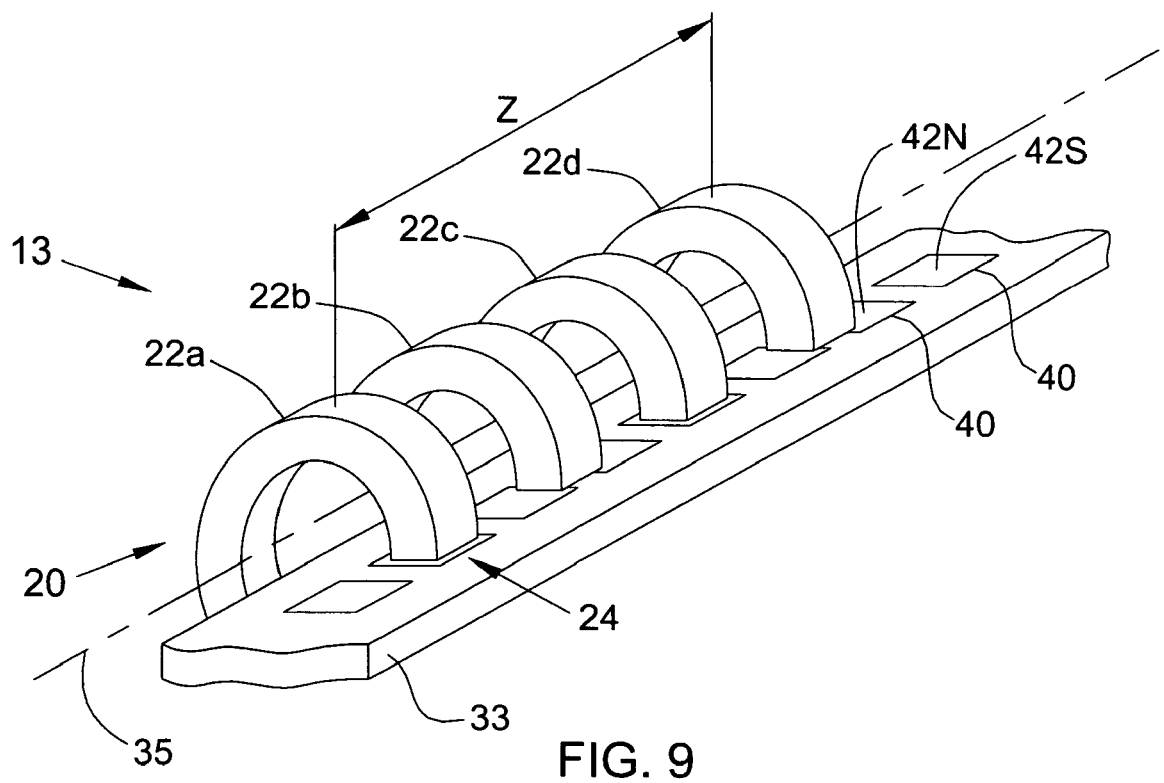
FIG. 9 is a partial perspective view of an electromechanical machine as a linear machine, in accordance with an embodiment of the invention.

FIG. 9 is a perspective view of a linear electromechanical machine 13 having a linear configuration, such as, but not limited to, a linear actuator, in accordance with an embodiment of the present invention. The electromechanical machine 13 comprises a stator 20 and a linear carrier 33. The electrical connections of the stator 20 are not shown for clarity. The stator 20 comprises four single-gap electromagnets 22 defining a stator group 26. The electromagnets 22 are arranged in side-by-side parallel, coaxial relationship defining a stator group length .z. having a predetermined length. The linear carrier 33 comprises a plurality of permanent magnets 40. The number of electromagnets 22 and the number of permanent magnets 40 within a stator group length .z. are predetermined for a particular purpose, which will be explained below.

As in the embodiment of FIG. 4, the ratio of permanent magnets 40 to electromagnets 22 is 6 to 4 within the stator group length .z. occupied by the stator group 26. In the embodiment of FIG. 9, the PM faces 42S, 42N of the PMs 40 are square, and the gap faces 24 of the electromagnets 22 are a corresponding square. The shape of the PMs 40 are shown by way of example and are not limited thereto. The PM faces 42 of the PMs 40 need have no particular shape to be effective, so long as the ratio of permanent magnets 40 to electromagnets 22 is 6 to 4 within the stator group length .z. occupied by the stator group 26.

FIGS. 10A-10D illustrate the timing relationship between the permanent magnets 40 and the electromagnets 22 for the rotary two-phase embodiment of FIG. 4, but for clarity of diagramming and illustration, linear diagrams are provided, as will generally be clear to those of ordinary skill in the art. FIGS. 10A-10D illustrate the four commutation events successively separated in phase from each other by 90 electrical degrees that define the four commutation intervals shown in FIG. 8

The arrows in FIGS. 10A-10D for each phase indicate the lines of attraction and/or repulsion between the permanent magnets 40 and the electromagnets 22 based upon the polarity of the excitation currents from the drive electronics 50 of FIG. 6. Referring again to the four commutation waveforms of FIG. 8, FIGS. 10A-10D illustrate schematically the waveforms of FIG. 8. IC1 and IC2 generate driver currents 180 electrical degrees out of phase so that when the excitation current in the first electromagnet 22a is positive, the excitation current in the third electromagnet 22c is negative, and vice versa. Another drive electronics 50 controls the second and fourth electromagnets 22b, 22d in the same manner but out of phase with respect to the first and third electromagnets 22a, 22c by 90 electrical degrees, or one-quarter of a cycle.

Referring again to FIG. 4, Hall-effect sensors IC5, IC6, which are coupled to the stator group 26 forward of the first electromagnet 22a, are shown superimposed on the rotor 30 and are spaced apart by 5 degrees along the stator arc length .alpha. in order to trigger their respective IC's, whereas IC5 is used to trigger first and third electromagnets 22a, 22c, and IC6 is used to trigger second and forth electromagnets 22b, 22d, at an electrical phase angle difference of 90 degrees so that trigger signals will be generated in the proper phase with each other.

In accordance with some embodiments of the present invention, the electromechanical machine is configured to be used as a motor, wherein electrical energy is converted to rotational energy to drive the drive shaft 38. In accordance with other embodiments of the present invention, the electromechanical machine is configured to be used as an electrical generator or alternator, wherein a source of rotational energy is used to drive the driveshaft to produce electrical current in the windings of the electromagnet.

In accordance with yet other embodiments of the present invention, the electromechanical machine is configured to be used as a motor, an electrical generator or alternator, and as a combination starter motor and electrical generator or alternator, such as, but not limited to, for an internal combustion engine. The output shaft 38 is coupled to a drive shaft of the engine. The electromagnets 22 of the stator 20 are electronically switched in polarity to attract and then repel the appropriate permanent magnets 40 in the rotor 30. This attraction and repulsion applies a rotational force to the disk rotor 36 and therefore rotates the output shaft 38 which is coupled thereto. Since there are no mechanical gears involved, as there are in conventional automotive starter motors, the starting action is silent. The starting mode of the electromechanical machine is controlled by suitable driving electronics 50, such as shown in FIG. 6.

Once the rotor 30 is rotating due to the controlling forces as described above, the electromechanical machine is driven as a generator by decoupling the driving electronics 50 and coupling generating electronics (not shown). The permanent magnets 40 moving past the electromagnets 22 with the driving electronics 50 switched off causes the flow of current in the windings that is input into the generating electronics.

Figure 11:
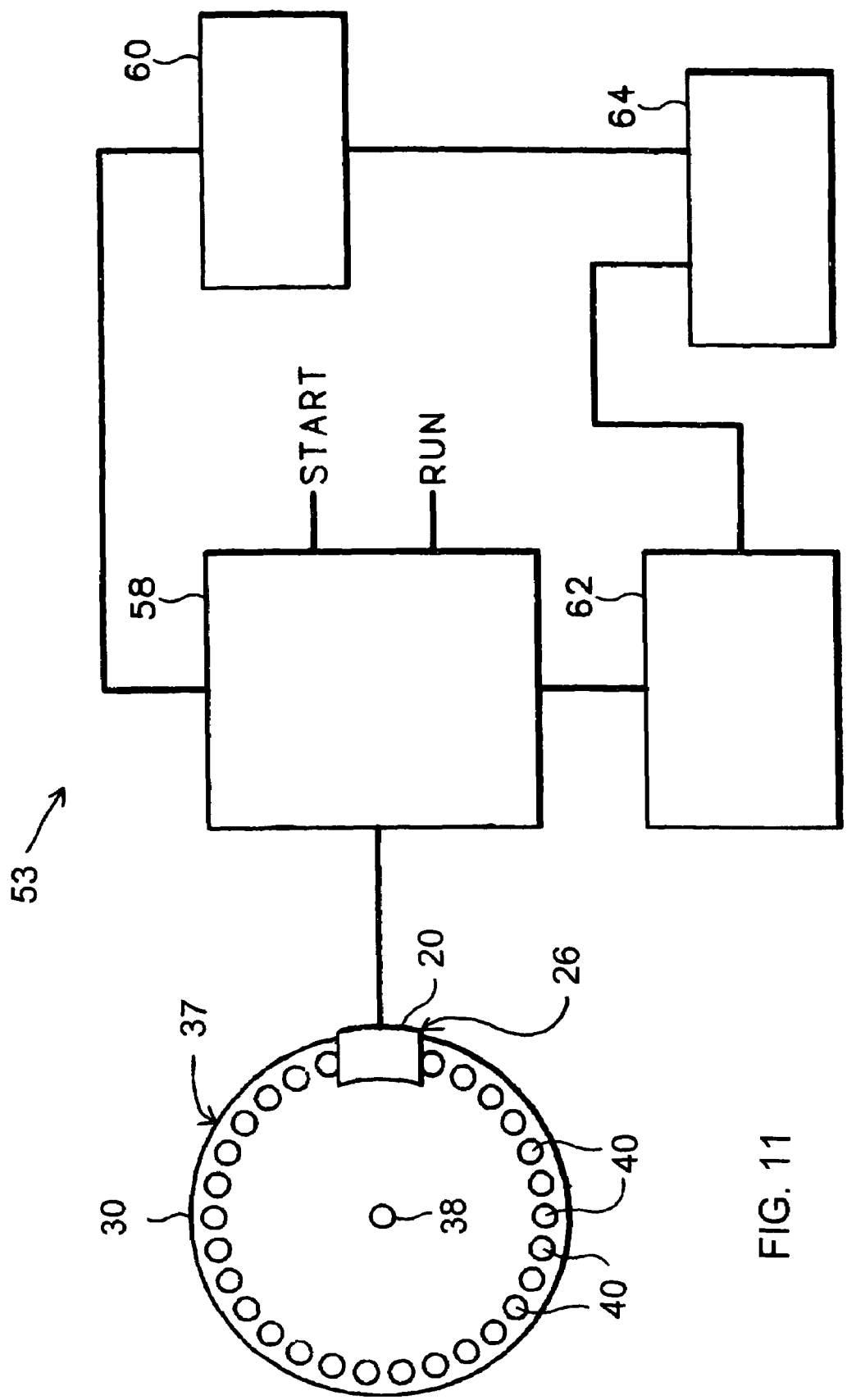
FIG. 11 is a schematic diagram of a circuit employing an electromechanical machine as a combination starter motor and alternator, in accordance with an embodiment of the invention.

FIG. 11 is a schematic diagram of a drive system 53 controlling a stator 20 in accordance with an embodiment of a electromechanical machine, such as a motor/generator. The rotor 30 is coupled to a shaft 38 which may in turn be coupled to, such as, but not limited to, a drive train of an automobile (not shown). Permanent magnets 40 are positioned about the disk periphery 37 of the rotor 30 as previously described for the embodiment of FIG. 1. A stator group 26 is situated adjacent the rotor 30 and includes four electromagnets 22 having substantially the same configuration as shown in FIG. 1. A switching module 58 switches between a circuit that accepts an input from a motor drive module 60 and one that provides an output to a rectifier and regulator module 62. The regulator module 62 charges a battery 64.

Signals on input lines labeled "start" and "run" respectively control the function of the switching module 58, for example. In the start mode, a starter circuit, such as, but not limited to, the circuit of FIG. 6, is turned on in the switching module. Once an engine has been started, a signal is provided to the "run" line turning off the starter circuit and allowing current from the stator 20 to flow directly to the rectifier and regulator module 62.

Figure 12A:
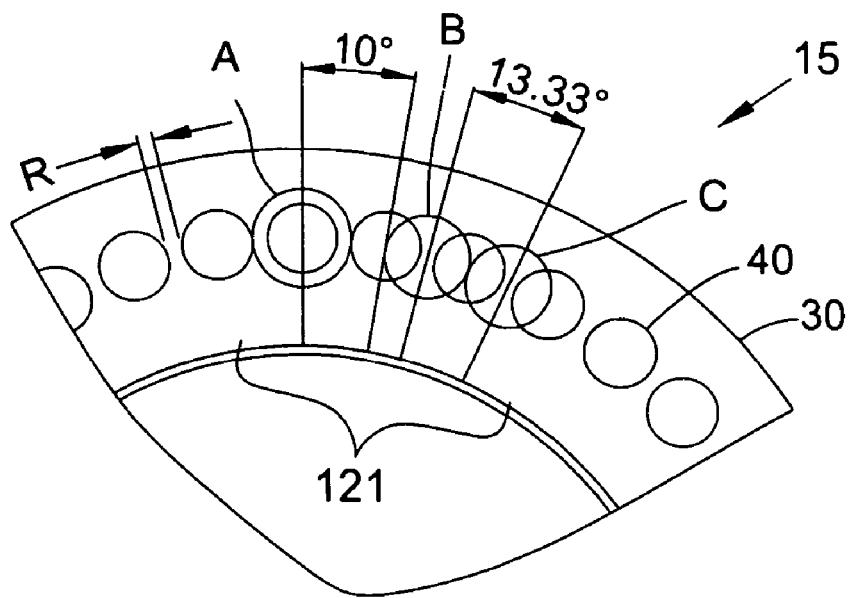
FIG. 12A is a top view of a portion of the rotor with the outline of the electromagnets superimposed thereon showing the relative positioning of the electromagnets to permanent magnets of a three-phase electromechanical machine, in accordance with an embodiment of the present invention.
Figure 12B:
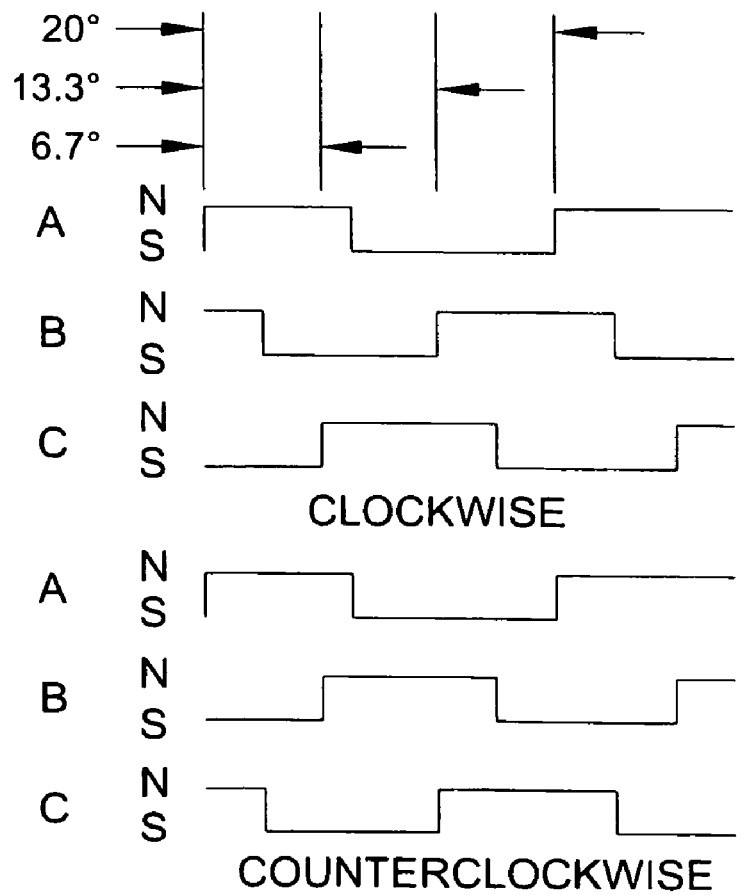
FIG. 12B is a three-phase timing diagram of waveforms for the three electromagnets of the embodiment of FIG. 12A.

FIGS. 12A and 12B illustrate a three-phase embodiment of an electromagnetic machine 15, in accordance with the present invention. FIG. 12A is a top view of a portion of the rotor 30 with the outline of three electromagnets 22, a first electromagnet 22a, a second electromagnet 22b, and a third electromagnet 22c, superimposed thereon showing the relative positioning of the electromagnets 22 to PMs 40. The PMs 40 are sized and spaced so that within the stator arc length .alpha., the ratio of permanent magnets 40 to electromagnets 22 is 4 to 3; the spacing of 10 degrees and 13.33 degrees, respectively.

In the embodiment of FIG. 12A, the stator 120 consists of three electromagnets 22; a first electromagnet 22a, a second electromagnet 22b, and a third electromagnet 22c. FIG. 12B shows a three-phase timing diagram of waveforms for the first electromagnet 22a, the second electromagnet 22b, and the third electromagnet 22c. The timing diagram repeats for every 20 degrees of rotation of the rotor 30, which corresponds to 360 electrical degrees, in accordance with an embodiment of a method of operating the drive electronics. The electrical phase shift from one electromagnet 22, such as the first electromagnet 22a, to the next electromagnet 22, such as the second electromagnet 22b, is 60 electrical degrees of the electrical cycle rather than 90 electrical degrees as with the 2-phase embodiments. The electrical cycle is defined to be the duration of movement necessary to cause a north/south magnet pair to cross the axis of an electromagnet 22, which is 20 degrees of rotor 30 movement.

In accordance with a three-phase embodiment, for every four permanent magnet spacings there are three electromagnet spacings. The timing of the four-to-three configuration would be controlled in the same manner as for the three-to-two configuration of the two-phase embodiments; where the 3:2 configuration of the two-phase embodiment has two identical circuits as illustrated in FIGS. 6 and 7, the 4:3 configuration of the three-phase embodiment has three identical circuits. Where the 3:2 configuration spaces the two Hall-effect sensors, shown electrically in FIG. 7, such that transition events occur five degrees of rotation apart, the 4:3 configuration spaces three Hall-effect sensors such that transition event occurs three and one-third degrees of 20 rotation apart.

Figure 13A:
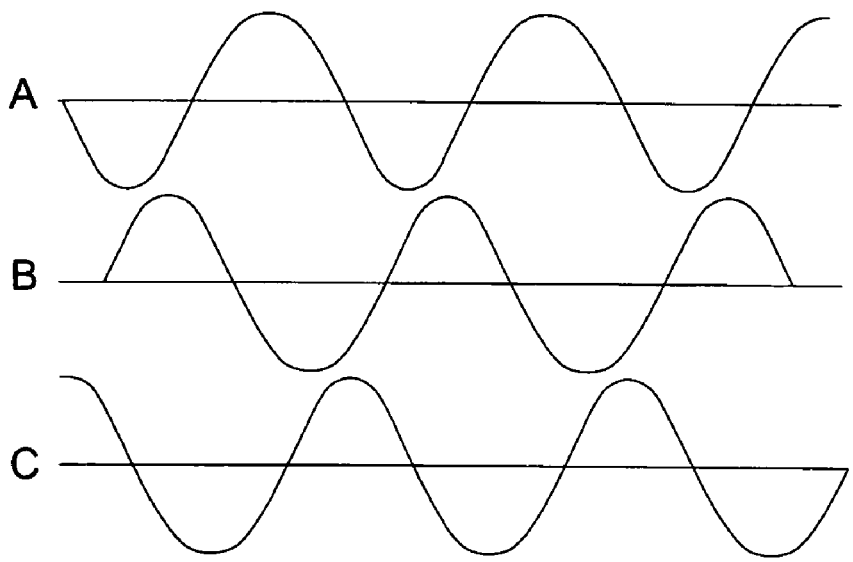
FIG. 13A is a three-phase voltage waveform diagram and associated +/− commutation table based on a 11.25 degree spacing between magnets and 3.75 degrees per commutation interval of the embodiment of FIG. 12A.
Figure 13B:
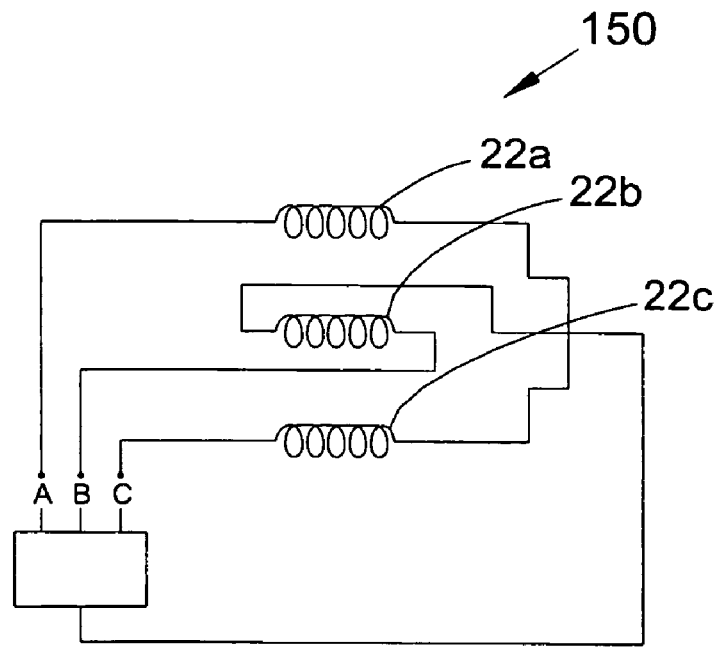
FIG. 13B is a schematic of a three-phase control electronics for a three phase all phases on motor control module, in accordance with an embodiment of the present invention.
Figure 13C:
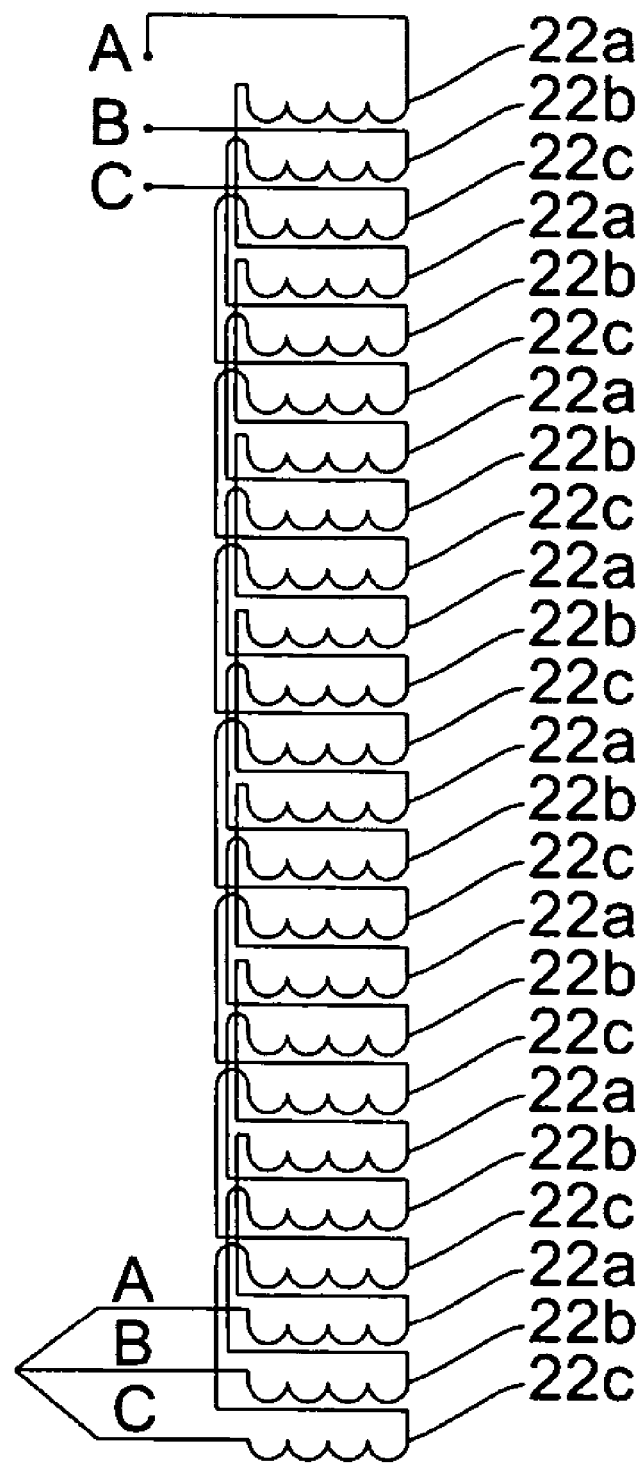
FIG. 13C is a schematic diagram of a plurality of electromagnets connected in series for a three-phase configuration, in accordance with an embodiment of the present invention.

FIGS. 13A-13G illustrate additional aspects of a 3-phase 4:3 configuration electromagnetic machine, in accordance with an embodiment of the present invention. FIG. 13A shows a three-phase voltage waveform and associated +/− commutation table based on a 11.25 degree spacing between magnets and 3.75 degrees per commutation interval. As illustrated, the A, B, C voltage polarities/permanent magnet configuration can be arranged so that two phases are substantially producing torque in each commutation interval, except at commutation events. FIG. 13B is a schematic of a three-phase control electronics 150 for a three phase all phases on motor control module (not shown). FIG. 13C is a schematic of a plurality of A, B and C phase electromagnets 22a, 22b, 22c connected in series for a three-phase configuration, in accordance with an embodiment of the present invention.

Figure 13E:
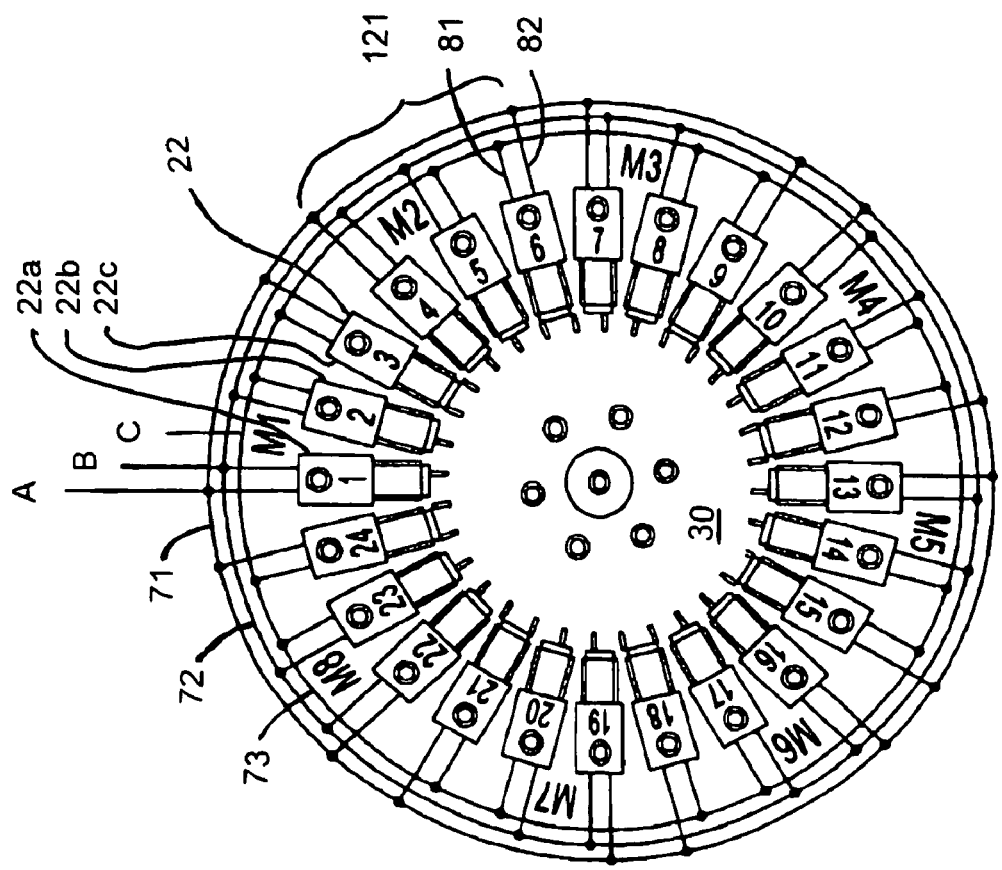
FIGS. 13D and 13E are schematic diagrams of a three-phase electromechanical machine based on a three-phase delta electrical connection, in accordance with an embodiment of the present invention.
Figure 13D:
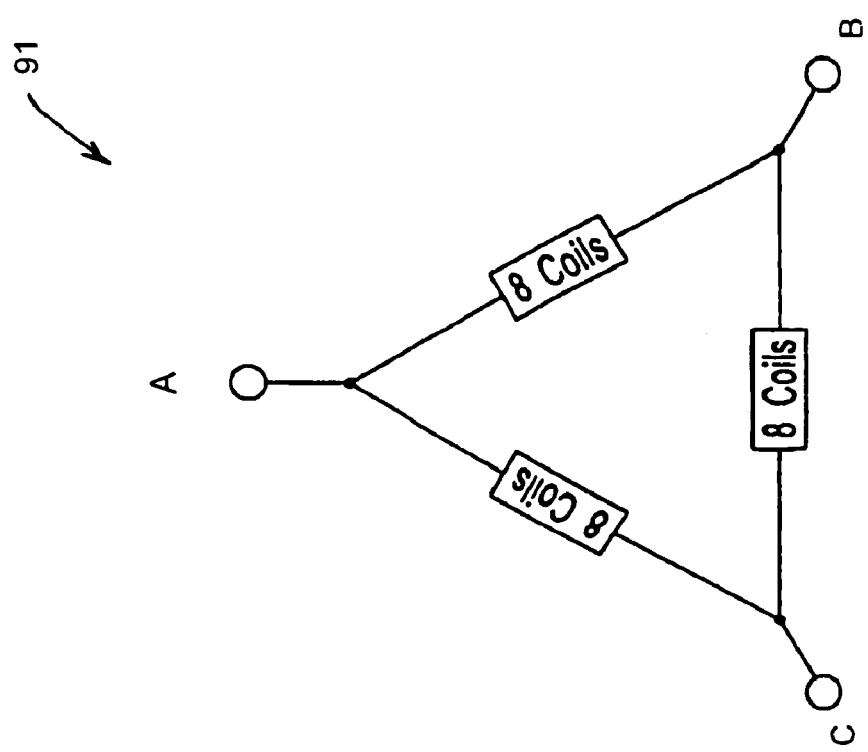

FIGS. 13D and 13E are schematics of a three-phase embodiment based on a three phase delta electrical connection 91. In FIG. 13E, twenty-four electromagnets 22, that is, eight stator modules 121 of three electromagnets 22 per stator module 121, are substantially uniformly arranged around the perimeter of the disk rotor 30, with 32 permanent magnets 40, shown in FIG. 13A. A single bus bar is provided for each of the drive phases. The first electromagnets 22a have a first winding lead 81 coupled to a first bus bar 71, and a second winding lead 82 coupled to a second bus bar 72; the second electromagnets 22b have a first winding lead 81 coupled to a second bus bar 72, and a second winding lead 82 coupled to a third bus bar 73; and third electromagnets 22c have a first winding lead 81 coupled to a third bus bar 73, and a second winding lead 82 coupled to the first bus bar 71.

Figure 13G:
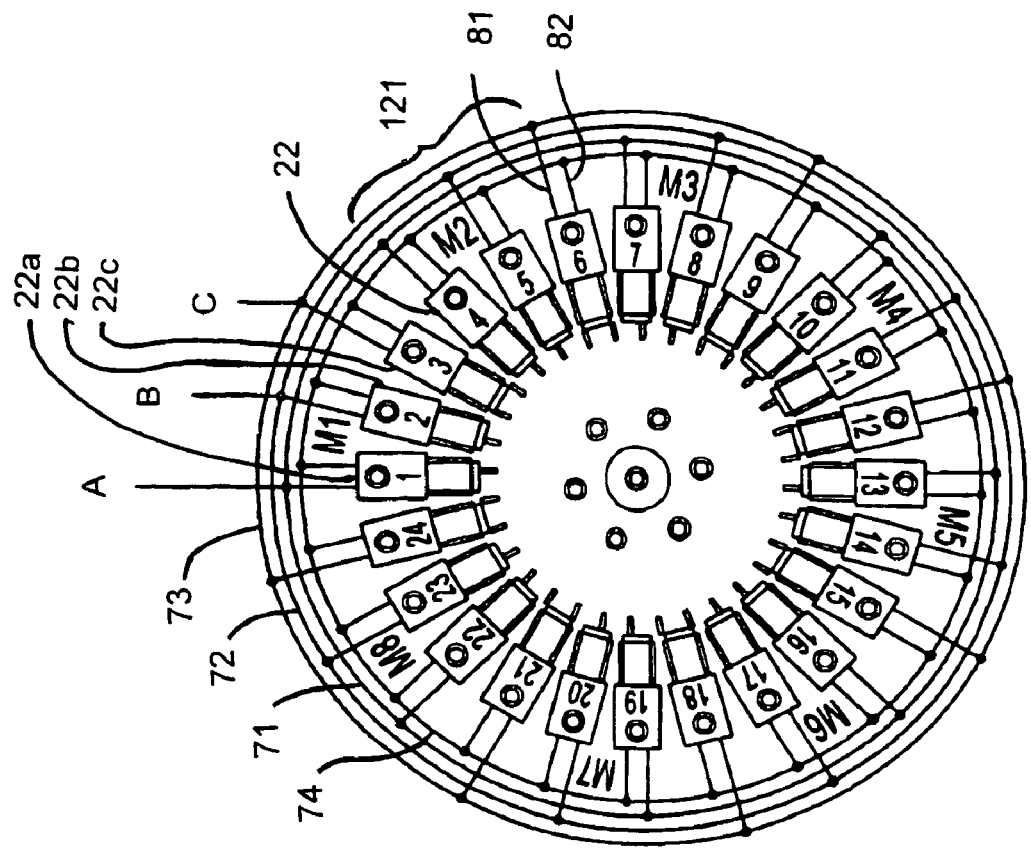
FIGS. 13F and 13G are schematic diagrams of a three-phase embodiment based on a three-phase wye electrical connection, in accordance with an embodiment of the present invention.
Figure 13F:
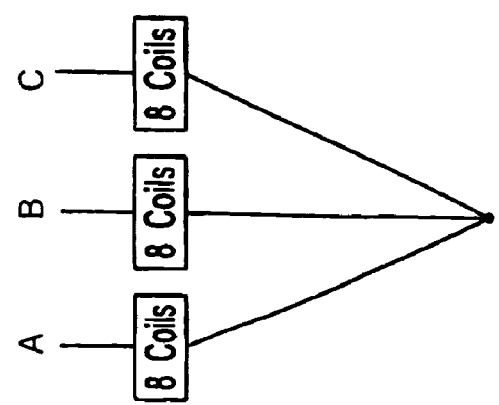

FIGS. 13F and 13G are schematics of a three-phase embodiment based on a three phase wye electrical connection 92. In FIG. 13G, twenty-four electromagnets 22, that is, eight stator modules 121 of three electromagnets 22 per stator module 121, are substantially uniformly arranged around the perimeter of the disk rotor 30, with 32 permanent magnets 40, shown in FIG. 13A. A single bus bar is provided for each of the drive phases plus a ground bus bar 74. The first electromagnets 22a have a first winding lead 81 coupled to a first bus bar 71, and a second winding lead 82 coupled to the ground bus bar 74; the second electromagnets 22b have a first winding lead 81 coupled to a second bus bar 72, and a second winding lead 82 coupled to the ground bus bar 74; and third electromagnets 22c have a first winding lead 81 coupled to a third bus bar 73, and a second winding lead 82 coupled to the ground bus bar 74.

In the embodiments above, the two-phase electromagnetic machine has a permanent magnet to electromagnet ratio of 3:2, and the three-phase electromagnetic machine has a ratio of 4:3. Higher phase electromagnetic machines are anticipated having a permanent magnet to electromagnet ratio in accordance to the ratio of (N+1):N, wherein N is the number of phases. Therefore, a four-phase electromagnetic machine has a ratio of 5:4, and so on.

With reference to the two and three-phase embodiments of the electromagnetic machine described above, the operation of the general embodiment of an electromagnetic machine with N phases of the excitation driving N stator phases will now be discussed, N being an integer. An electromagnetic machine of the rotor disk-type motor embodiment will be used to describe the general embodiment, although as noted above, the application to linear embodiments will generally be clear to those of ordinary skill in the art. A fully-populated stator, that is, one wherein all available electromagnet positions around the circumference of the rotor are filled by an electromagnet, is also assumed for clarity and simplicity. Aspects of the present invention relating specifically to generator embodiments are also described below.

Both the electromagnetic machine and the controller employed for excitation of the electromagnetic machine are described as having N phases. In the case of the N-phase electromagnetic machine, the stator 20 comprises N distinct and separate stator phases, each of which receive its own distinct excitation waveform of current from the appropriate phase output terminal of an N-phase controller. The N-phase controller produces N phase waveforms.

The structure of the electromechanical machine of the present invention is spatially periodic in both the stator 20 and the rotor 30. The electromagnets 22 are placed at substantially equal intervals of one stator period Ds. One stator period Ds is defined as the distance between corresponding points of two adjacent electromagnets 22, as for example between the centers of corresponding gap faces 24. Similarly, the permanent magnets 40 on the rotor 30 are placed at substantially equal intervals of one rotor period Dr, defined as the distance between corresponding points of two adjacent permanent magnets 40, as for example, between the centers of corresponding permanent magnet faces 42N, 42S.

In an electromagnetic machine having a rotor 30, the periods Ds and Dr are most conveniently and consistently expressed as an angle measured about the rotational axis 32 of the rotor 30. Although in principle, linear measure could be used in the rotary electromagnetic machine by measuring along the respective arcs of stator 20 and rotor 30, unless these arcs have equal radii and thus coincide, errors will result in the use of the formula below that specifies the required ratio of stator period and rotor period. In a linear embodiment, Ds and Dr are correctly and conveniently expressed in linear measure for this purpose. Reference to the two and three-phase embodiments already described will clarify these points.

It is convenient to refer to the relative spatial periods of the electromagnets 22 and permanent magnets 40 in addition to or in place of the relative numbers of electromagnets 22 and permanent magnets 40. The ratio of stator period Ds to rotor period Dr is equal to $(N+1)/N$, where N is the number of electrical phases. In applying this formula to embodiments of an electromagnetic machine having a rotor 30, the stator period and rotor period are expressed in angular measure as described above, while for linear embodiments of the electromagnetic machine these periods are expressed in linear measure. It is clear from the $(N+1)/N$ formula that the stator period Ds is always larger than the rotor period Dr.

The position of the rotor 30 and other quantities of interest can be described in terms of the electrical phase angle .phi., rather than by the mechanical angle of rotation. A cycle of 360 electrical degrees corresponds to the movement of two adjacent permanent magnets 40 of opposite polarities through the gap 23 of a single electromagnet 22, and thus to rotation of the rotor 30 through an angular distance 2 times Dr measured about the rotation axis 32 of the rotor 30 in a rotary embodiment of the electromechanical machine; or through a linear distance 2 times Dr along the direction of travel of a linear embodiment of the electromechanical machine. A rotor displacement of one electrical cycle returns the magnetic polarity configuration of the stator 20 and rotor 30 to its state at the beginning of the cycle. These definitions will be clear and familiar to a person of ordinary skill in the art.

Figure 14A:
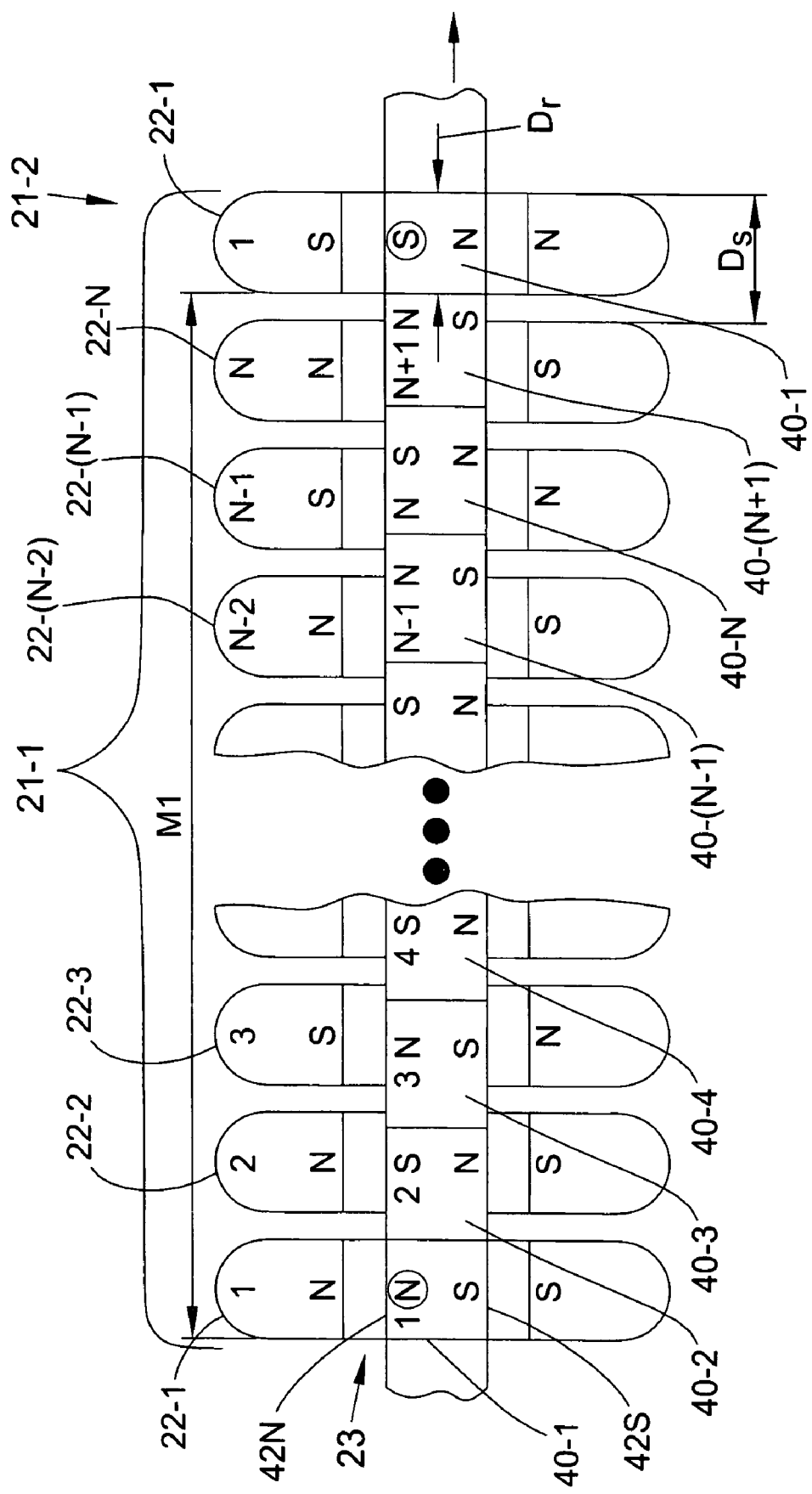
FIGS. 14A and 14B are schematics of the arrangement of the electromagnets and permanent magnets in a general N-phase embodiment in accordance with the present invention.
Figure 14B:
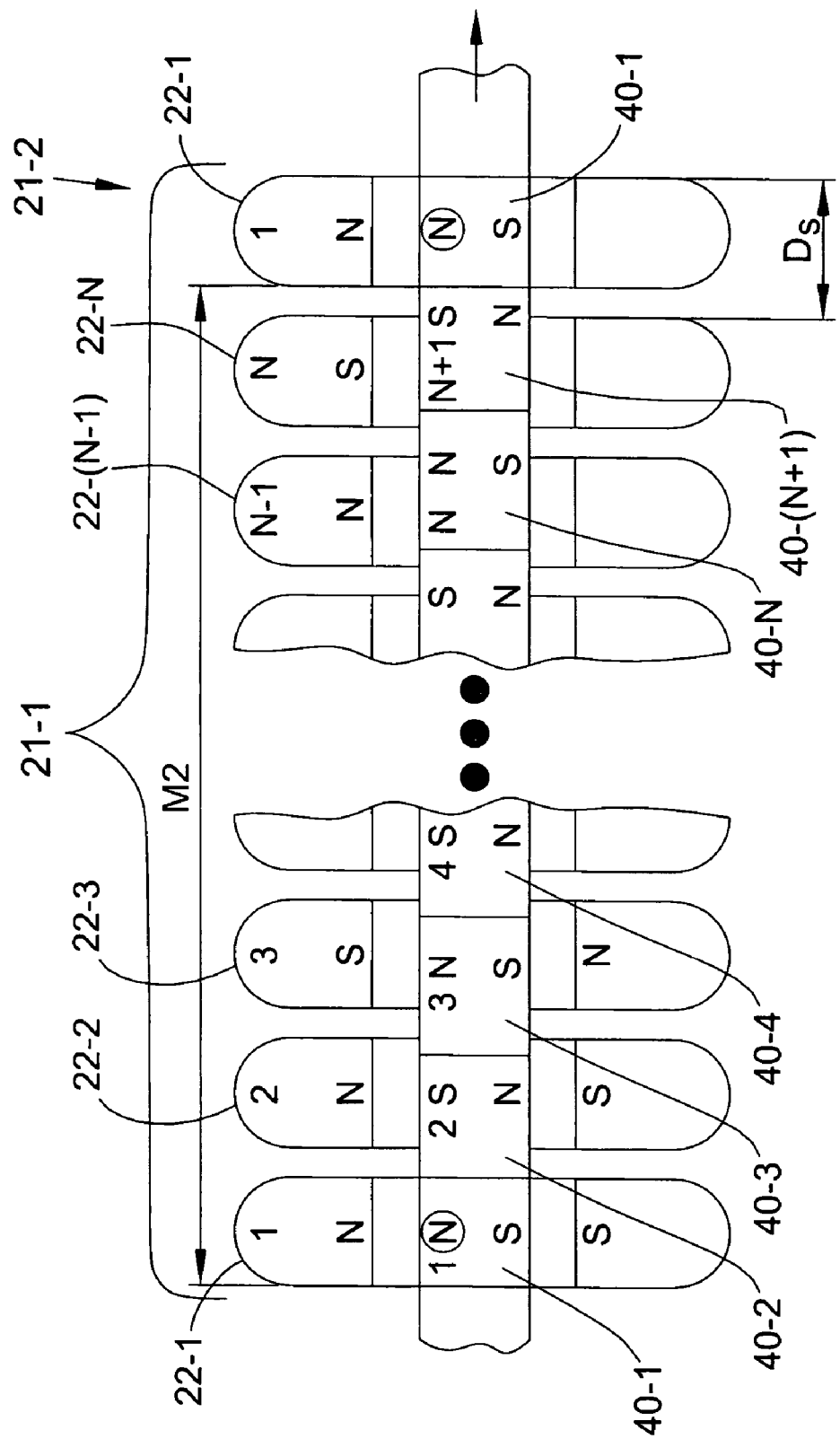

FIGS. 14A and 14B represent schematically the arrangement of the electromagnets 20 and permanent magnets 40 in a general N-phase embodiment of the electromechanical machine in a manner similar to the representation in FIG. 10A of the two-phase embodiment previously described. FIGS. 14A, 14B and 10A are constructed assuming that all N phases are excited at all times, except at the instants of excitation current reversal, referred to as commutations or commutation events. For simplicity, a linear arrangement is shown, but as noted above, the rotary operation is essentially the same. Single-gapped toroidal electromagnets 22 are again used as the electromagnets of the stator 20. The embodiment of the electromechanical machine wherein N is an even integer is shown in FIG. 14A, whereas the embodiment of the electromechanical machine wherein N is an odd integer is shown in FIG. 14B.

In both FIGS. 14A and 14B, a single stator module 21N of N electromagnets is shown, together with the first electromagnet 40 of an adjacent second stator module 21-2 in the direction of motion. A corresponding rotor module 34N is shown and defined as those permanent magnets 40 occupying the same arc length .alpha. as the stator 20N and containing N+1 permanent magnets 40 set immediately adjacent to each other with no space between successive permanent magnets 40, again for simplicity. Also shown is the first permanent magnet 40 of the next rotor module 34N in the direction of motion. As the rotor 30 rotates, the rotor module 34N passes by the stator module 21N, thus continually changing their relative alignment.

Each electromagnet 40 within a stator module 21 is labeled sequentially with an integer n from 1 to N indicating its order within the stator module 21 and the phase to which it belongs. Each permanent magnet 40 is similarly labeled with an integer m from 1 to N+1. In both the stator module 21-1 and rotor module 34-1, the numbers increase in the direction of motion. However, individual permanent magnets 40 are not associated with a particular excitation phase. The rotor is shown positioned with permanent magnet 40-1 of the first rotor module 34 exactly centered in electromagnet 22-1 of the first stator module 21 with the rotor 30 moving to the right. The instantaneous polarities of the electromagnets 22 and permanent magnets 40 are indicated by N and S as before.

As the rotor 30 moves in the indicated direction, the polarity of each electromagnet 22 undergoes a commutation, a change of polarity, whenever a permanent magnet 40 is exactly centered in the gap 23 of that electromagnet 22. This is accomplished by reversing the direction of current flow in the winding of the electromagnet 22, using a suitable controller such as one that is triggered by rotor position sensors such as the Hall effect sensors previously described. All electromagnets 40 bearing the same number belong to the phase of that number and are commutated together, regardless of the stator module 21 in which they occur in cases where the stator 20 comprises more than one stator module 21.

One electrical cycle of 360 electrical degrees results when the rotor 30 has rotated through an angle 2 times Dr and two adjacent permanent magnets 40 of opposite polarities, such as permanent magnets 40-1, 40-2 have passed through the gap 23 of a single electromagnet 22. There will be two commutation events for an electromagnet 22 per 360 electrical degrees, and hence for each stator phase, during each electrical cycle. The commutation events will be separated by one rotor period Dr, or 180 electrical degrees. Thus, the total number of commutations in each cycle counting all phases will be 2 times N. In the two-phase embodiment of the electromechanical machine, four commutations will occur, whereas in the three-phase embodiment, six commutations will occur, in agreement with the descriptions of those embodiments given above. The intervals of 180 electrical degrees between successive commutations of a single electromagnet 22 or its stator phase, during which the polarity of that electromagnet 22 remains unchanged, will be referred to as commutation intervals.

In the general case of N excitation phases, the commutation events in the different phases will occur in time in the numerical order of the electromagnets 20 and stator phases associated with them. At the point in time shown in FIGS. 14A and 14B, the electromagnet 40-1 has just undergone a commutation from South to North, using the upper gap face 24 to indicate polarity. The permanent magnet 40-2, however, must move a distance Ds—Dr before it is centered in the gap 23 of electromagnet 22-2. Defining the electrical-angle equivalent of this distance .delta phi., electromagnet 22-2 lags a phase angle .delta phi. behind electromagnet 40-1. In general, the phase lag increases for the later electromagnets 22. The first commutation of electromagnet 22-n/phase n lags (n−1) times .delta phi. behind that of electromagnet 22-1/phase 1, each differing by .delta phi. in electrical phase from the electromagnets before and after in the direction of motion of the rotor 30. For example, electromagnet 22-3/phase 3 lags 2 times .delta phi., and electromagnet 22-N/phase N lags (N−1) times .delta phi., behind electromagnet 22-1/phase 1. The pattern of commutations and phase lags is dictated by the structure of the embodiments according to the specified ratio of stator period Ds to rotor period Dr, and the N excitation waveforms supplied by the controller must conform to this pattern.

When permanent magnet 40-(N+1) has finally moved into the center of the gap 23 of electromagnet 22-1 of the second stator module 21-2, the rotor 30 will have moved exactly one rotor period Dr, or one-half electrical cycle of 180 electrical degrees, and all N phases will have experienced their first commutation event, for a total of N commutation events counting all phases. Since at that instant the rotor 30 will also have moved exactly N times .delta phi. electrical degrees, .delta phi. can be seen to be equal to 180/N electrical degrees; 90 degrees for two-phase and 60 degrees for three-phase, in agreement with the two- and three-phase embodiments described above. When the next permanent magnet 40-N in sequence moves another rotor period Dr into the center of the gap 23 of the electromagnet 22-1 of stator module 21-2, a cycle of 360 electrical degrees will be complete. The magnetic polarity configuration of stator 20 and rotor 30 will have returned to its initial state and 2 times N commutations for all phases will have occurred during that cycle.

Figure 15A:
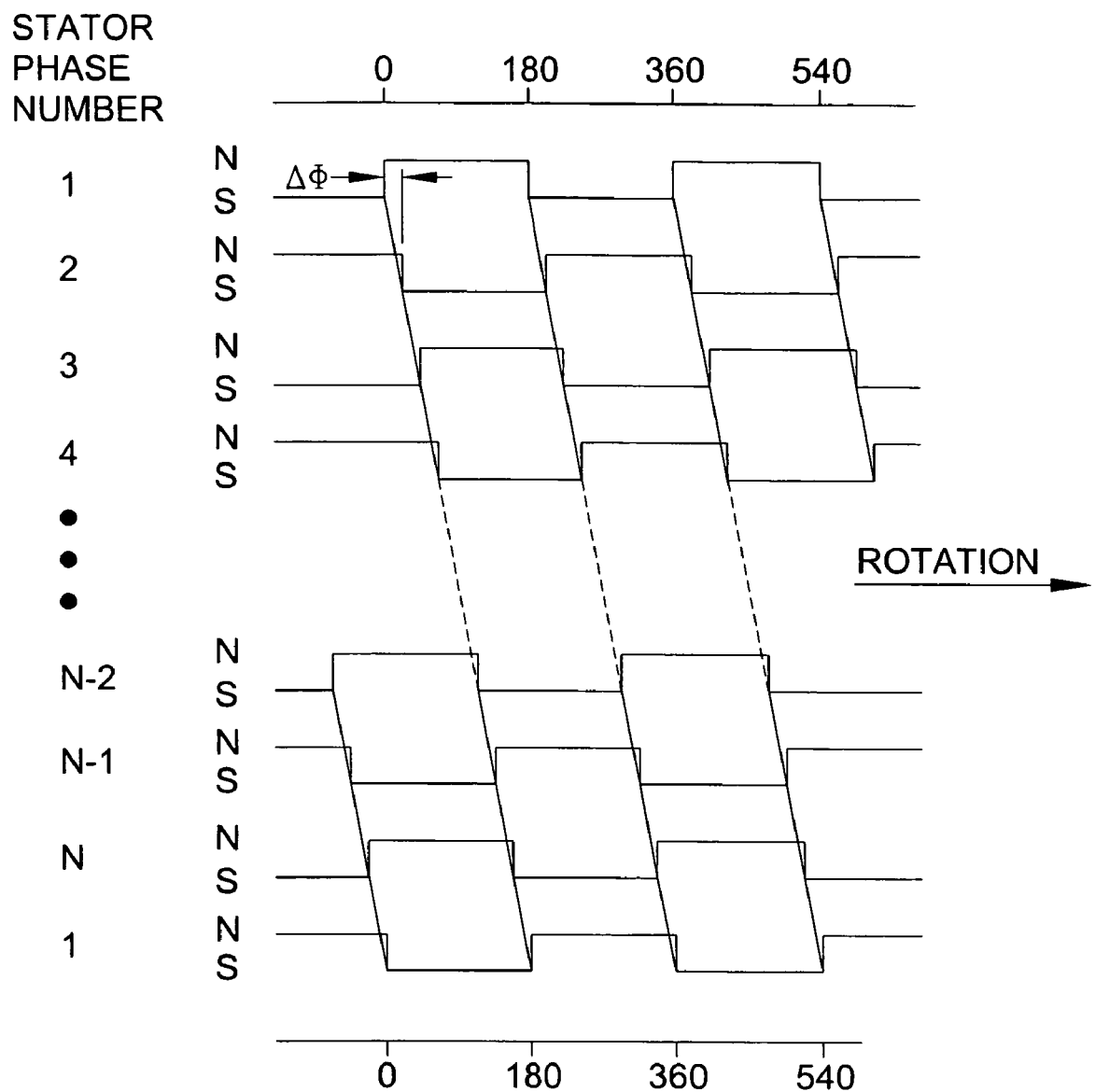
FIGS. 15A and 15B are phase commutation waveforms as functions of electrical phase angle for each of the N excitation phases of an electromechanical machine for N even and for N odd, respectively, in accordance with an embodiment of the present invention.
Figure 15B:
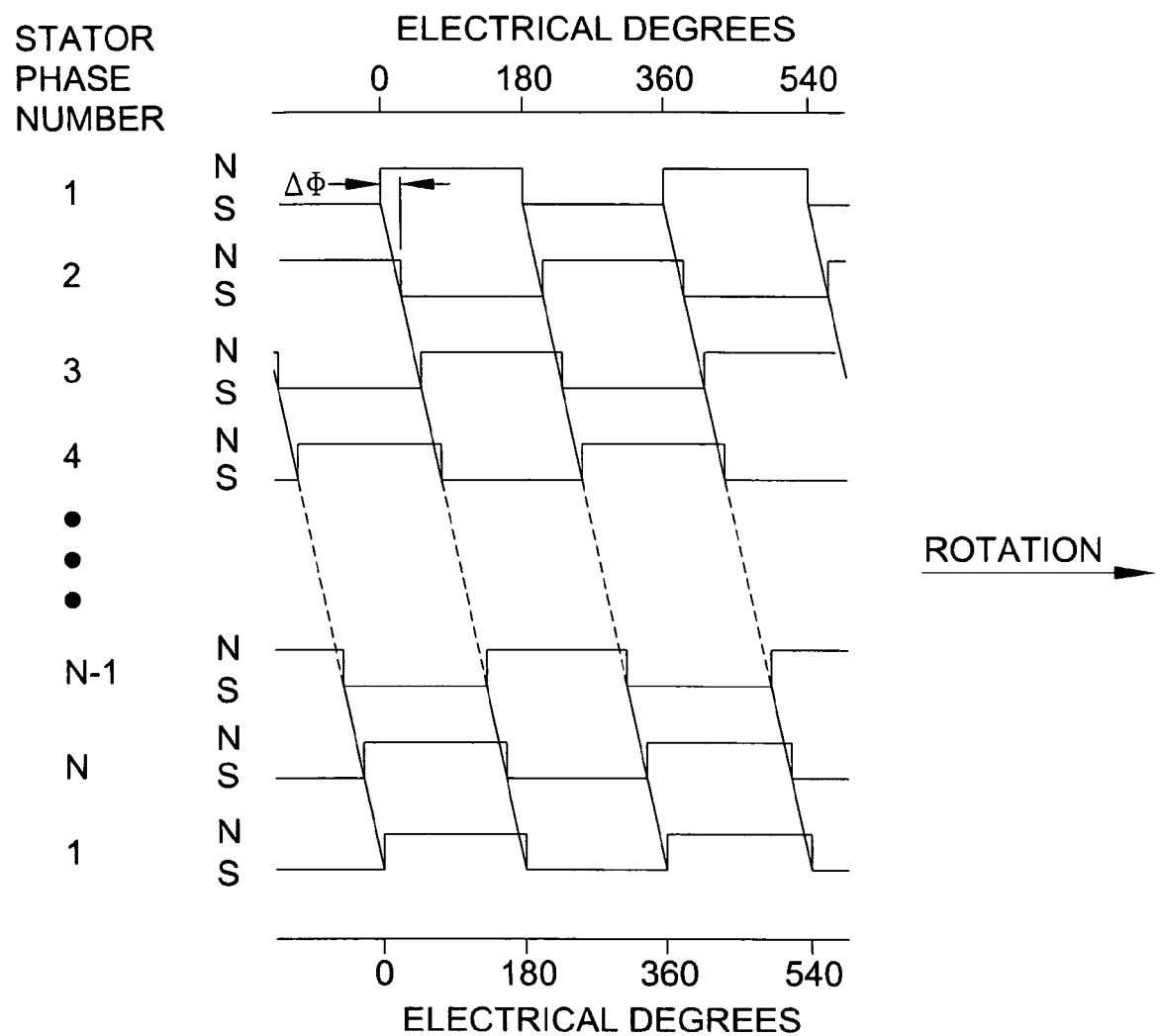

FIGS. 15A and 15B show for N even and for N odd, respectively, phase commutation waveforms as functions of electrical phase angle for each of the N excitation phases of the electromechanical machine, in accordance with an embodiment of the present invention. Each waveform indicates the N or S polarity of the upper face of each electromagnet 22 and its commutations during the movement of the rotor 30. Oblique lines indicate the progressive phase lag as the excitation phase number increases from 1 to N.

Also shown is the waveform for excitation phase 1 of the second stator module 21-2 as the last waveform. For N an even number, this waveform is the negative or inversion of the waveform for phase 1 of the first stator module 21-1. That is, for embodiments wherein N is an even number, successive stator modules 21-s must have opposite currents in corresponding electromagnets 22. This is provided for by electrically connecting the windings for phase n from successive stator modules 21-s in alternating polarity within each stator phase.

For embodiments wherein N is an odd number, the waveforms for the first electromagnets 22-1 of each stator module 21-m are identical, and thus all electromagnets 22 of a given stator phase are driven with identical polarities in all phases. By comparing the even and odd cases of FIGS. 14A and 14B respectively, it is clear that this difference of behavior between even and odd-N embodiments stems from the reversal of polarity between permanent magnet 40-1 of the first rotor module 34-1 and permanent magnet 40-1 of the second rotor module 34-2 in the N even case but not the N odd case. The ultimate cause is the fact that for N even, the number N+1 of permanent-magnets 40 in one stator-module arc length is odd, while for N odd, N+1 is even.

The two and three-phase embodiments described above illustrate this fundamental difference. Note that in the two-phase embodiment, a stator group 26 of four electromagnets was shown instead of the stator module 21 of two electromagnets 22 dictated by the N-phase rule. This is not in fact a contradiction: the stator group 26 of four electromagnets 22 is the smallest repeating unit from the electrical and magnetic points of view, as it contains two direct and two inverted drive polarity electromagnets 22 with corresponding magnetic inversions. However, the minimum necessary operational stator module 21 comprises only two electromagnets 22 as the rotor 30 of the electromechanical machine will rotate with this minimum number. Using the minimum operational stator module 21 permits specifying a single unified stator module 21-s of N electromagnets 22 for both even and odd-N cases. Using the double module of 2 times N electromagnets 22 for even N embodiments leads to the unnecessary complication of a separate definition in each case: 2 times N for even N, and N for odd N.

It will now be clear to a person of ordinary skill in the motor and generator art that the commutation waveforms shown in FIGS. 15A and 15B are essentially the excitation waveforms supplied to conventional N-phase motors, except for a factor of +1 or −1 due to the alternation of waveform polarity between adjacent phases shown in those figures, and neglecting the exact shape of the excitation waveforms between phase commutation events, such as, but not limited to, sinusoidal and trapezoidal, as employed in the art. These excitation waveforms normally are shifted relative to each other by the same electrical angle .delta phi. as in the present invention, and are generally supplied from, but not limited to, the electrical mains and an electronic controller in the case of three-phase motors, and by electronic controllers in general. An N-phase embodiment of the electromechanical machine of the present invention can thus be excited electrically in a manner similar or identical to conventional N-phase motor practice. Provision for the alternating polarity between physically adjacent stator phases can be made with various combinations of wiring connections of the electromagnets to the source providing the excitation phases, sensor positioning and logical output levels for commutation triggering, and controller circuitry and logic in a convenient manner, among others.

To reverse the direction of motion of the rotor or linear actuator of the general N-phase motor, a set of reverse commutation waveforms analogous to FIGS. 15A and 15B is constructed using the same procedures employed for the forward direction, as will be evident to those of ordinary skill in the art. These reverse commutation waveforms will be generated as before by the motion, now reversed, of the rotor PMs past the Hall sensors or by other means as previously discussed, and passed to the controller inputs. The set of reverse commutation waveforms contains the same waveforms as the forward set, but certain of the reverse commutation waveforms will be generated by different stator phases than for forward motion.

The reverse commutation waveforms will cause the controller to supply a corresponding set of reverse excitation current waveforms to the stator phases, thereby reversing the direction of motion of the rotor or linear actuator. The set of reverse excitation current waveforms contains the same waveforms as the forward set, but coordinated with the associated commutation waveforms, certain of the reverse excitation current waveforms will be supplied by the controller to different stator phases than before. Details of the reversal process depend on the particular value of the number N of phases. As before, even and odd N cases must be considered separately.

For example, FIG. 12B shows the sets of commutation waveforms for clockwise (CW) and counterclockwise (CCW) rotation of the three-phase embodiment. It is clear that reversal of rotation is accomplished in this case by interchanging commutation waveforms 222b and 222c associated with electromagnets 22b and 22c, respectively, in the excitation of motor phases 2 and 3 by the controller means, while leaving the motor phase 1, the commutation for 222a associated with electromagnet 22a, unchanged. That is, the commutation waveform appropriate to motor phase 2 for CW rotation is supplied to motor phase 3 for CCW rotation, while at the same time the commutation waveform appropriate to motor phase 3 for CW rotation is supplied to motor phase 2 for CCW rotation.

A major benefit of embodiments of the electromechanical machines in accordance with the present invention is that the rotor is self starting, that is, the motor will start from any stopped position of the rotor. Starting a general N-phase motor embodiment, of the electromechanical machine in accordance with the present invention, from rest requires supplying phase excitation currents of the polarities dictated for the electrical phase angle in the stopped position of the rotor 30 by the commutation waveforms for either forward or reverse rotation as desired. The required strength of each phase current will be determined by the requirements of the specific application contemplated, as, for example, a need for high initial torque to move a heavy load, as will be obvious to those of reasonable skill in the controller art. In any case, it will be necessary to supply phase currents of at least a minimum strength in order to overcome any mechanical friction or cogging forces due to residual attractions of the permanent magnets 40 to the cores 27 of the electromagnets 22, as is well known in the art.

Whatever the stopped position of the rotor 30, the motor of embodiments of the electromechanical machine of the present invention will start because at any electrical angle there can be at most only one phase that is undergoing a commutation event and thus is producing no force or torque, as, for example, waveform 222a of phase 1 shown in FIGS. 14A and 14B. All other phases will be producing useful force or torque in the desired direction of motion. All motor embodiments of the electromechanical machine in which N is two or greater are self starting.

In motor embodiments of the electromechanical machine where N is equal to one, the motor will not be self starting. If the rotor 30 happens to stop at an electrical angle corresponding to a commutation event, no torque can be produced to move the rotor 30, and there is no other stator phase to supply the lack. However, rotary and linear actuator embodiments of the one-phase electromechanical machine are possible.

To obtain the maximum possible force and torque production from a given electromagnet 22, the permanent magnet separation, that is, the interval between adjacent permanent magnets 40 of the rotor 30, should be as small as possible and preferably zero, as shown for clarity and simplicity in FIGS. 10A-10D relating to a two-phase motor embodiment of the electromechanical machine. In FIG. 10A, a permanent magnet 40 is in the center of the gap 23 of the first electromagnet 22a. In this position of the rotor 30, the first electromagnet 22a produces no force or torque in the desired direction of rotation. However, at this same rotor position, two permanent magnets 40 are in the gap 23 of the second electromagnet 22b, each PM 40 being half in and half out of the gap 23 and producing the maximum level of force and torque possible for this structure.

The force and torque exerted on the rotor 30 by one electromagnet 22 can be calculated by determining the force experienced by the equivalent Amperean surface currents of a permanent magnet 40 due to the magnetic field strength produced in the gap 23 by the electromagnet 22 and its excitation current, taking the N/S axis of the permanent magnet to be parallel to the magnetic field. The result shows that the maximum force is produced when one half of the permanent magnet 40 is within a volume with a uniform magnetic field of the greatest possible strength while the other half is within a volume where the magnetic field strength is zero. Any departure from this condition will reduce the force and torque produced.

In FIG. 10A, a non-zero separation between adjacent permanent magnets 40 is now introduced by reducing the widths of all permanent magnets 40 in the direction of motion of the rotor 30, while keeping the stator period and rotor period unchanged. Now the two permanent magnets 40 in the gap 23 of the second electromagnet 22b no longer extend as far as before into either the central region of the gap 23 where the magnetic field strength is highest, or into the fringing field regions to either side of the gap 23 where the magnetic field strength is lower. Although the magnetic field strength is not either uniform or zero as envisaged for the ideal case above but rather falls smoothly away from the center of the gap 23 and more rapidly outside the gap 23, the force and torque produced by the second electromagnet 22b still tend to be reduced by the introduction of a non-zero separation between permanent magnets 40.

Therefore, in optimal designs, permanent magnet spacing may be reduced to a minimum by selecting the material and dimensions of the disk 36 to maintain satisfactory mechanical rigidity for the requirements of the application. The shortfall of force and torque production resulting from non-zero permanent magnet spacing must be made up by changes in other parts of the design, as, but not limited to, increasing the radii of the permanent magnet 40 and gap faces 24.

Figure 16:
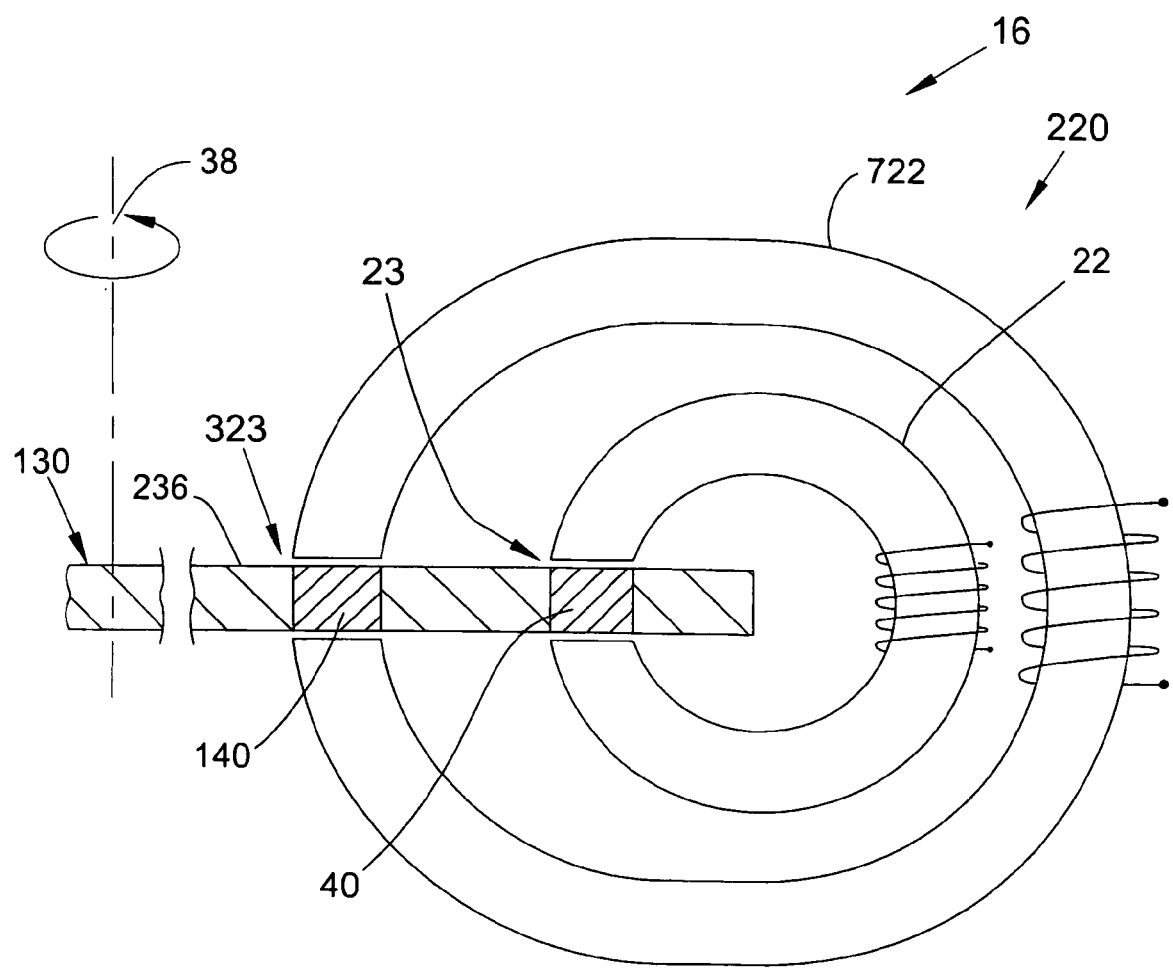
FIG. 16 is a partial side cross-sectional view of another electromechanical machine, in accordance with an embodiment of the present invention.

FIG. 16 is a partial side cross-sectional view of another electromechanical machine 16, in accordance with an embodiment of the present invention. The electromechanical machine 16 is distinguished over the embodiment of FIG. 1 by a double-ring rotor 130 comprising two rings of permanent magnets, an outer ring of permanent magnets 40 adjacent the periphery of the disk 236 and a coaxial inner ring of permanent magnets 140. Further, a first single-gap electromagnet 22 is positioned as provided in FIG. 1 such that the outer ring of permanent magnets 40 pass through the gap 23. A second single-gap electromagnet 722 is nested with and extends over the first electromagnet 22 such that the inner ring of permanent magnets 140 pass through the gap 323 of the second electromagnet 722. The embodiment of FIG. 16 will provide approximately double the torque as compared with an embodiment having a single ring of permanent magnets 40, such as shown in FIG. 1. However, the electromechanical machine 16 having a second single-gap electromagnet 722 will be substantially larger and heavier than the electromechanical machine 10 having a single-gap electromagnet 22, due to the additional size and weight of the second single-gap electromagnet 722.

Figure 17A:
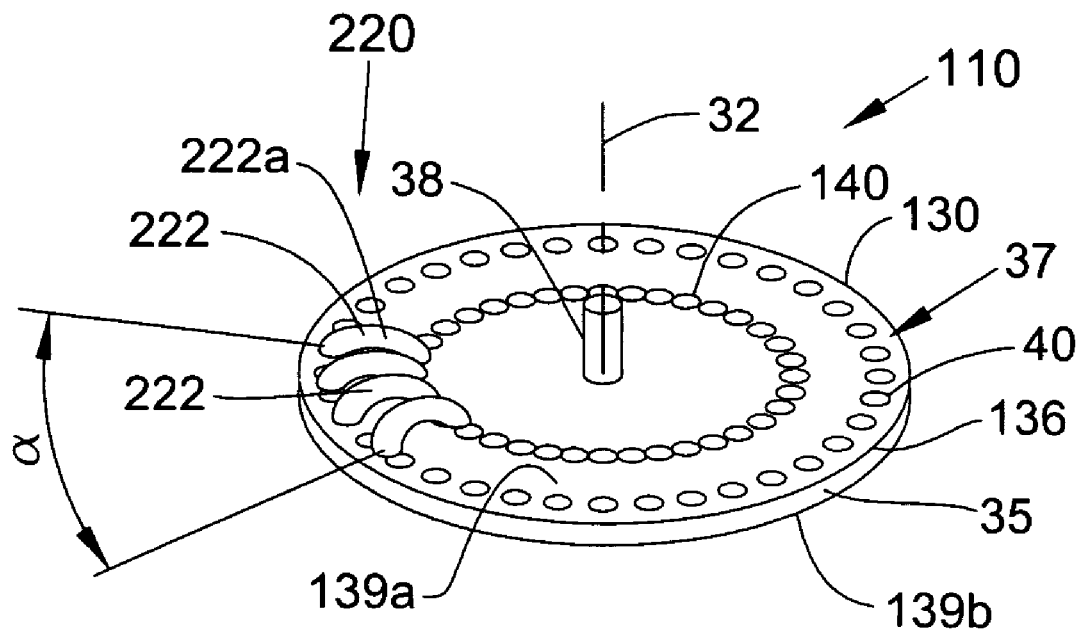
FIGS. 17A, 17B and 17C are perspective, top and partial side cross-sectional views of another electromechanical machine, in accordance with an embodiment of the present invention.
Figure 17B:
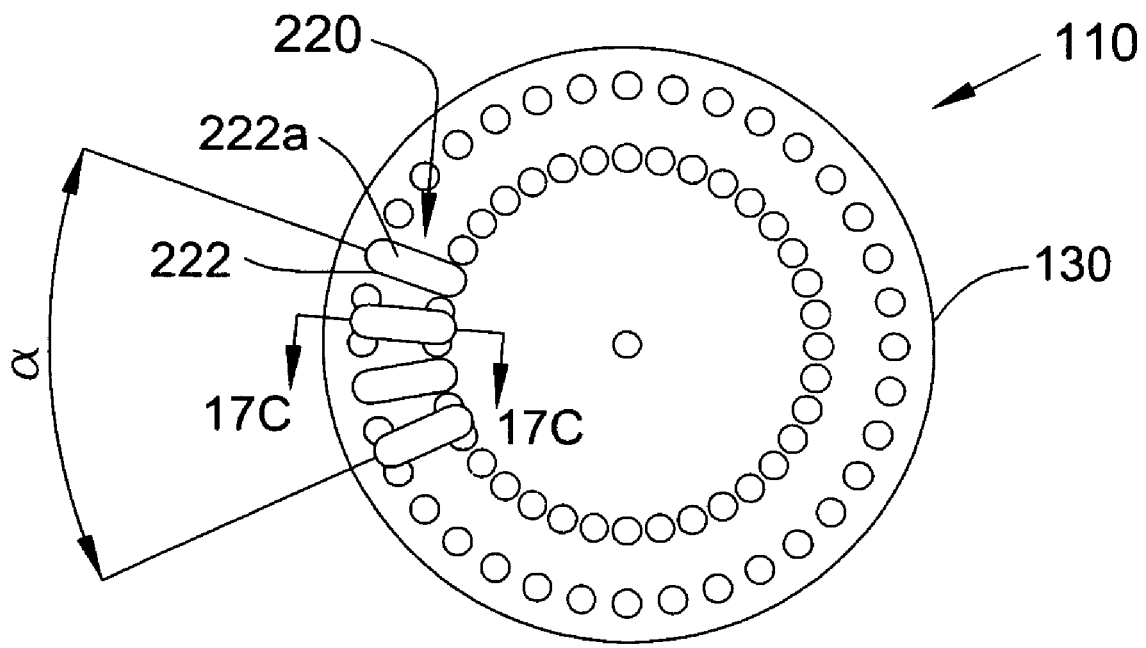
Figure 17C:
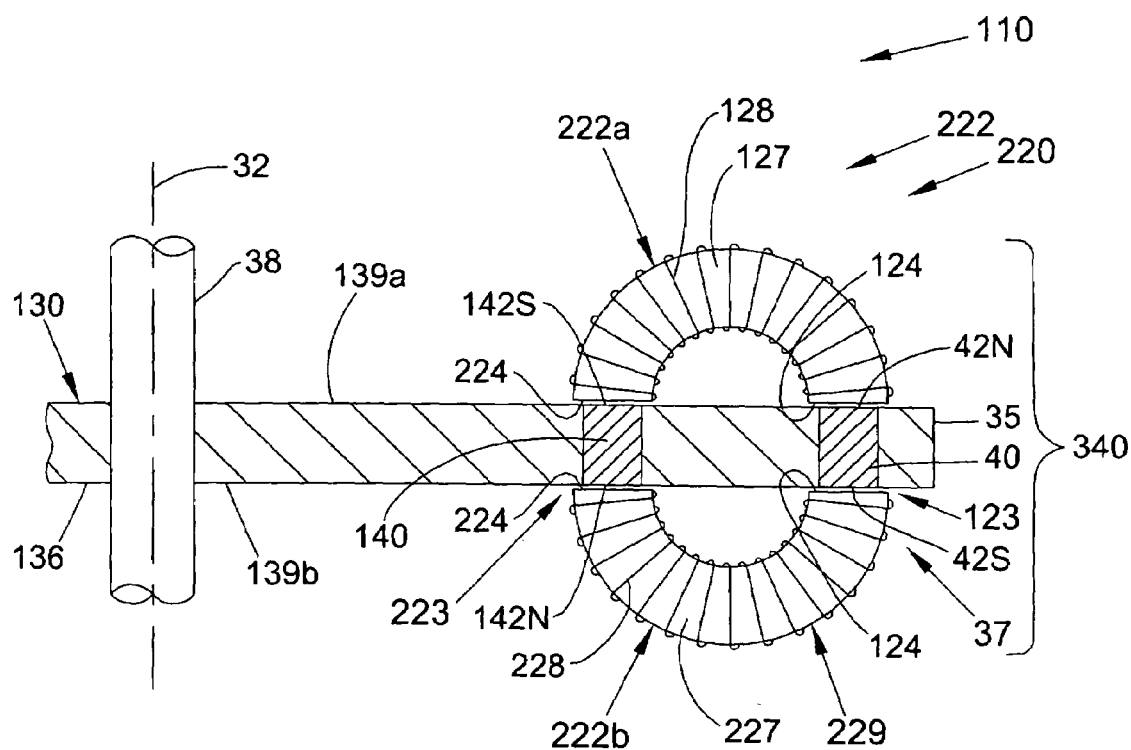

FIGS. 17A and 17B are perspective and top views, respectively, of another electromechanical machine 110, in accordance with an embodiment of the present invention. FIG. 17C is a partial cross-sectional view along, cut line 17C-17C. The electromechanical machine 110 comprises a stator 220, a double-ring rotor 130, and a shaft 38. The electrical connections of the stator 220 are not shown for clarity. The stator 220 comprises a plurality of double-gap electromagnets 222. The double-gap electromagnet 222 comprises a first half electromagnet 222a and a second half electromagnet 222b. The first half electromagnet 222a comprises a first half core 127 including a first winding 128 and the second half electromagnet 222b comprises second half core 227 including a second winding 228. The first half core 127 and the second half core 227 define a double-gap core 229.

The double-gap core 229 defines a discontinuous toroid defining a first gap 123 having two opposing gap faces 124 spaced apart a predetermined distance adapted to allow the double-ring rotor 130 to pass through, and a second gap 223 having two opposing gap faces 224 spaced apart a predetermined distance adapted also to allow the double-ring rotor 130 to pass through. The first and second gaps 123, 223 are substantially coplanar to allow the double-ring rotor 130 to simultaneously pass through.

The double-ring rotor 130, in this embodiment, a disk rotor, comprises a disk 136 that supports a plurality of permanent magnets 40, 140 there through. The disk 136 defines a disk first side 139a and a disk second side 139b. The disk 136 defines a rotation axis 32 perpendicular to the disk first and second sides 139a, 139b. Shaft 38 is coaxial with the rotation axis 32. The disk 136 also defines a disk periphery 37 adjacent to a disk edge 35.

The double-ring rotor 130 comprises an even number of a plurality of outer permanent magnets 40 (PM) carried by the disk 132 about an outer circle about the disk periphery 37 that is coaxial with the rotation axis 32. The double-ring rotor 130 further comprises an even number of inner permanent magnets 140 carried by the disk 132 about an inner circle coaxial with and of a smaller diameter as the outer circle of PMs 40. The quantity of inner PMs 40 is the same as the outer PMs 140, with each of the inner PMs 140 substantially on a radial axis as complementary outer PMs 40 defining radial permanent magnet pairs 340. The inner and outer PMs 40, 140 have a cylindrical bar shape that defines two PM faces, a north face 42N, 142N having a north magnetic polarity and a south face 42S, 142S having a south magnetic polarity. The shape of the PMs 40, 140 are shown by way of example and are not limited thereto. The PMs 40, 140 extend through the disk 132 such that the disk first and second sides 139a, 119b are adjacent to either the north or south faces 42N, 142N, 42S, 142S. The PMs 40 are arranged on the disk 36 wherein adjacent outer PMs 40 have opposite polarity; such that where a PM 40 has a north face 42N adjacent the disk first side 39a, the next adjacent PM 40 will have a south face 42S adjacent the disk first side 39a, and so forth in alternating relationship. Permanent magnets 40, 140 of each of the radial permanent magnet pairs 340 are of opposite polarity.

The first half core 127 is located adjacent the disk first side 139a and aligned radially with the rotation axis 32 such that the outer gap face 124 is adjacent the outer permanent magnets 40 and the inner gap face 224 is adjacent the inner permanent magnets 140. The second half core 227 is located adjacent the disk second side 139b, opposite the first half core 127 and aligned radially with the rotation axis 32 such that the outer gap face 124 is adjacent the outer permanent magnets 40 and the inner gap face 224 is adjacent the inner permanent magnets 140. Respective permanent magnets 40, 140 of radial permanent magnet pairs 340 will pass through respective outer and inner gaps 224, 124 substantially simultaneously.

The first winding 128 and second winding 228 of each double-gap electromagnet 222 are connected to and excited by the same phase of excitation current so as to maintain the same consistent, controllable direction of magnetic flux, either clockwise or counterclockwise, in both the first half core 127 and the second half core 227. This excitation, combined with the opposing polarities of the permanent magnets 40, 140 passing through the outer and inner gaps 224, 124, ensures that the action of the double-gap electromagnet 222 produces torque on the rotor 130 in the same direction, either clockwise or counterclockwise, when acting on the outer and inner permanent magnets 40, 140.

Since the double-gap electromagnets 222 occupy a volume above and below the double-ring rotor 130, a larger diameter double-ring rotor 130, and therefore larger diameter rings of the outer and inner permanent magnets 40, 140, can be provided as compared with the rotor 30 of embodiment of FIG. 1 wherein the single-gap electromagnets 22 extend beyond the edge 35 of the rotor 30.

The electromechanical machine 110 comprising a stator 220 having double-gap electromagnets 222 will have substantially double the torque and power available from the motor in substantially the same volume and weight as an electromechanical machine 10 comprising a stator 20 having single-gap electromagnets 22, in contrast with the electromechanical machine 16 having a second single-gap electromagnet 722.

Figure 18:
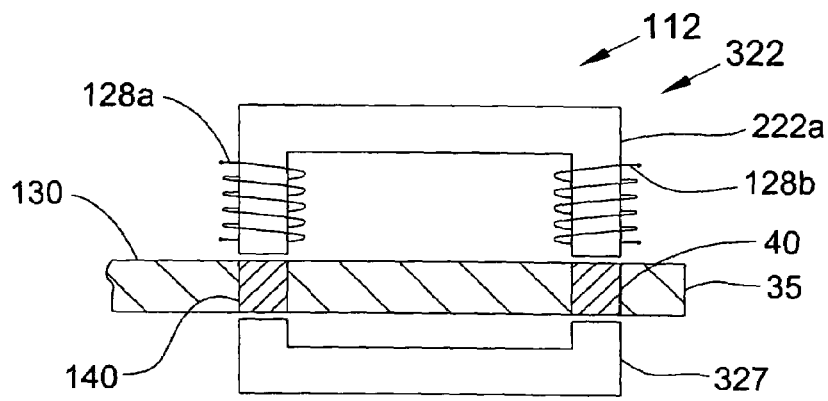
FIG. 18 is a partial side cross-sectional view of another electromechanical machine, in accordance with an embodiment of the present invention.

FIG. 18 is a partial side cross-sectional view of another electromechanical machine 112, in accordance with an embodiment of the present invention. The electromechanical machine 112 is substantially the same as the embodiment of FIG. 17, but comprises a half-wound double-gap electromagnet 322 comprising a first half electromagnet 222a and a passive magnetic flux return path 327 instead of the second half electromagnet 222b. The passive magnetic flux return path 327 comprises a material that has a relatively high magnetic permeability and a narrow hysteresis loop, such as, but not limited to, that provided by a second half core 227 without a winding 228. The passive magnetic flux return path 327 may be reduced in height as compared with a second half electromagnet 222b of FIG. 17, and therefore reduces the thickness of the electromechanical machine 112.

Figure 19:
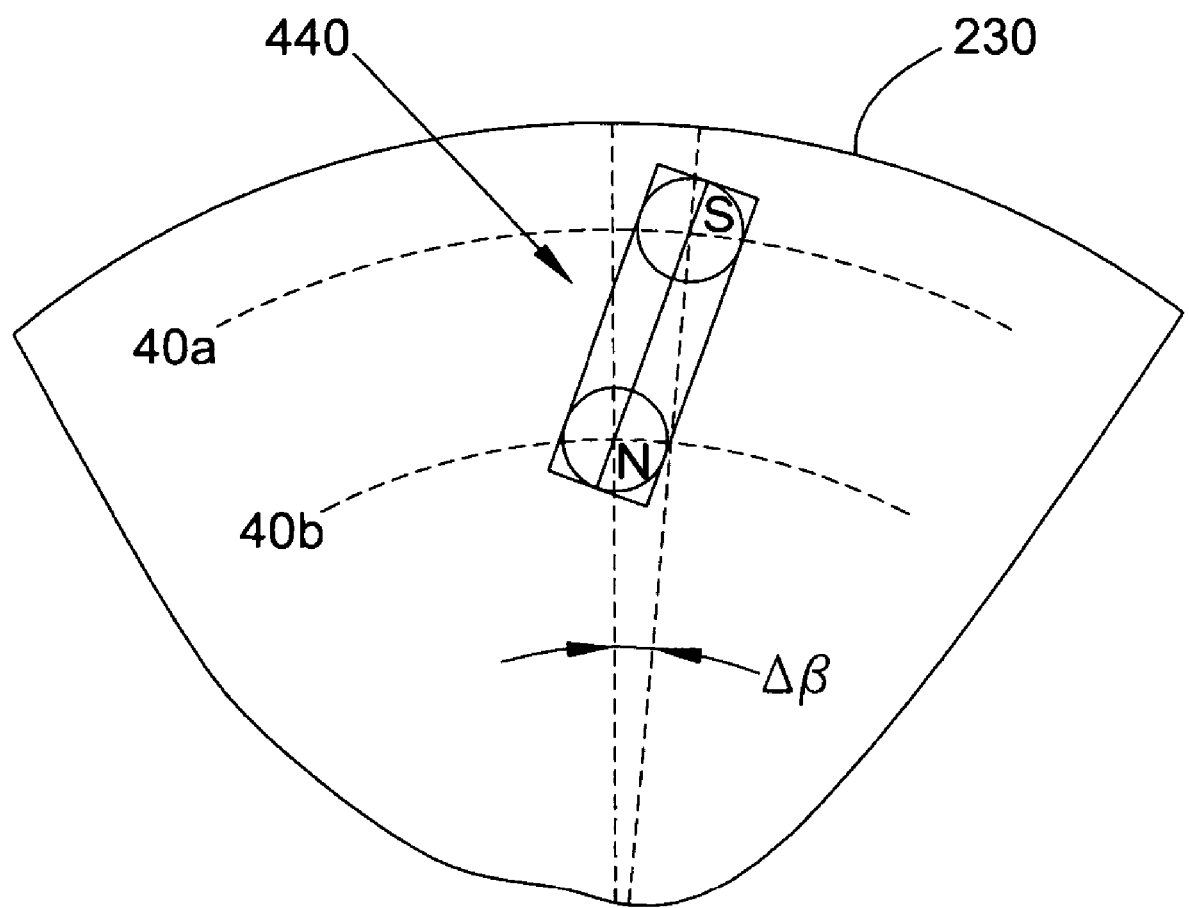
FIG. 19 is a partial top view of a double-ring rotor, in accordance with an embodiment of the present invention.

FIG. 19 is a partial top view of a double-ring rotor 230, in accordance with an embodiment of the present invention. The double-ring rotor 230 is substantially the same as the double-ring rotor 130 of the embodiment of FIG. 17, with the difference that the double-ring rotor 230 comprises non-radial permanent magnet pairs 440. The non-radial permanent magnet pairs 440 are oriented at an offset angle .beta. which corresponds to a complementary offset angle of the respective double-gap electromagnets 222.

Figure 20:
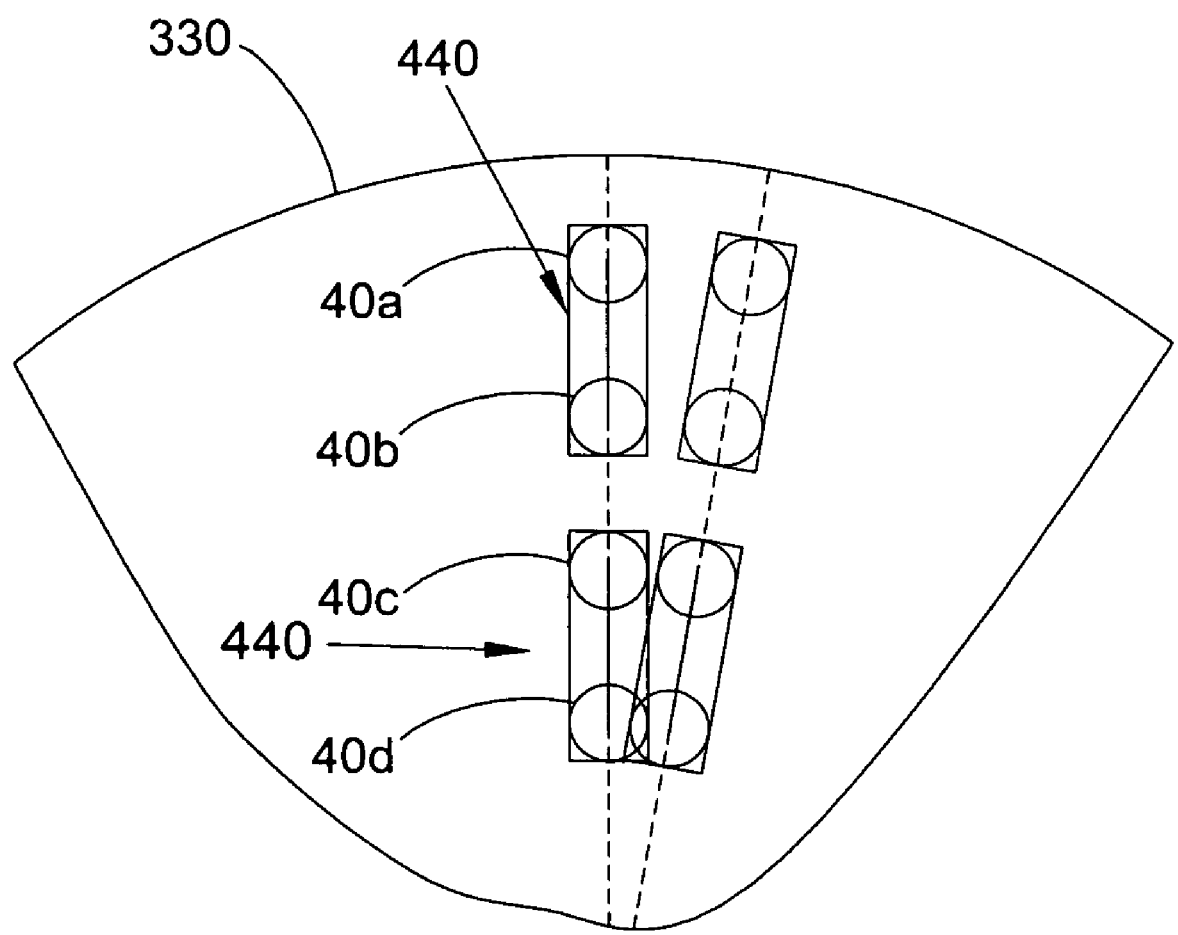
FIG. 20 is a partial top view of a quad-ring rotor, in accordance with an embodiment of the present invention.

FIG. 20 is a partial top view of a quad-ring rotor 330, in accordance with an embodiment of the present invention. The quad-ring rotor 330 is substantially the same as the double-ring rotor 130 of the embodiment of FIG. 17, with the addition of another ring of permanent magnet pairs 440. The quad-ring rotor 330 allows for the addition of another ring of double-gap electromagnets 222 to obtain even more torque and power.

Figure 21:
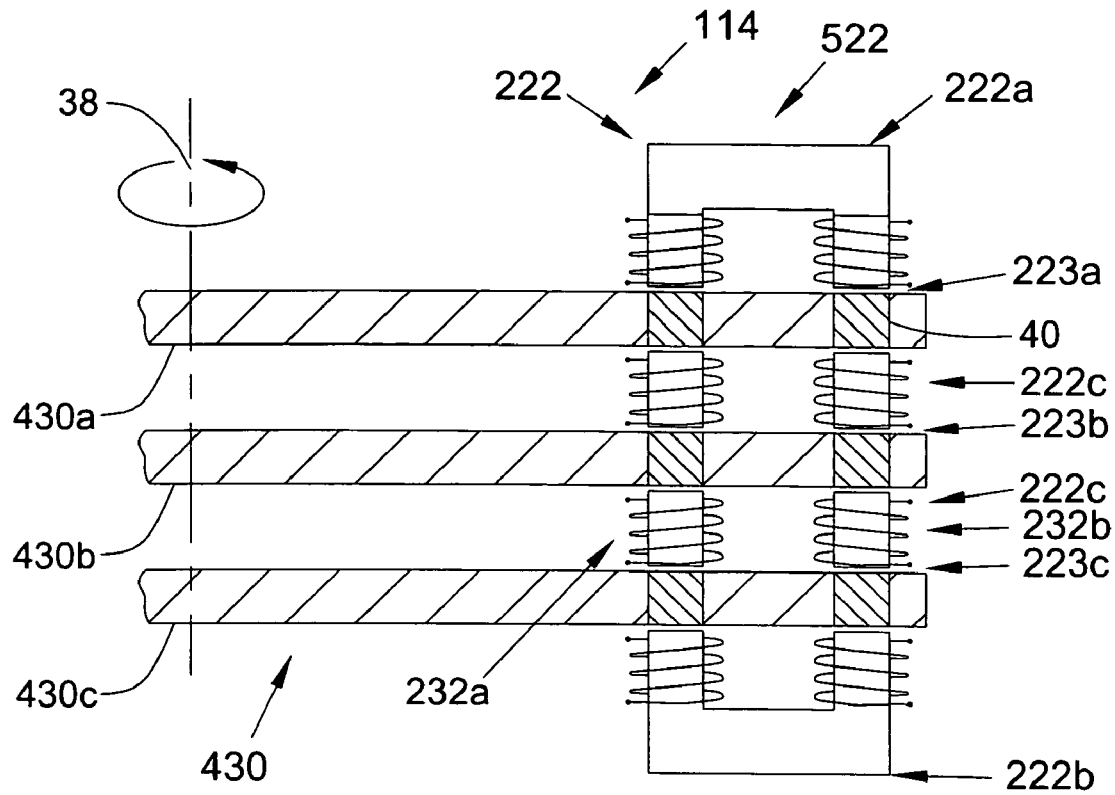
FIG. 21 is a side cross-sectional view of another electromechanical machine comprising a stacked-rotor and a poly-gapped electromagnet, in accordance with an embodiment of the present invention.

FIG. 21 is a side cross-sectional view of an electromechanical machine 114 comprising a stacked-rotor 430 and a poly-gapped electromagnet 522, in accordance with an embodiment of the present invention. The poly-gapped electromagnet 552 comprises a first half electromagnet 222a and a second half electromagnet 222b, and a plurality of straight electromagnet pairs 222c there between. The straight electromagnet pairs 222c comprise an inner straight electromagnet 232a and an outer straight electromagnet 232b. All of the electromagnets, the first half, second half, and straight electromagnet pairs 222a, 222b, 222c of a closed magnetic circuit are driven by the same excitation phase.

The stacked rotor 430 comprises a plurality of double-ring rotors 430a, 430b, 430c spaced apart along an axis of rotation 38, each substantially as described for the embodiment of FIG. 17. The first half electromagnet 222a, second half electromagnet 222b, and the plurality of straight electromagnet pairs 222c there between define a plurality of double-gaps 223a, 223b, 223c, adapted such that each of the double-ring rotors 430a, 430b, 430c passes through a corresponding one of the double-gaps 223a, 223b, 223c. The polarities are shown with the permanent magnets 40, 140 centered in the respective gaps 223, and at the time phase when the electromagnet polarity has just changed sign to push the permanent magnets 40, 140 out of the gaps 223.

Figure 22:
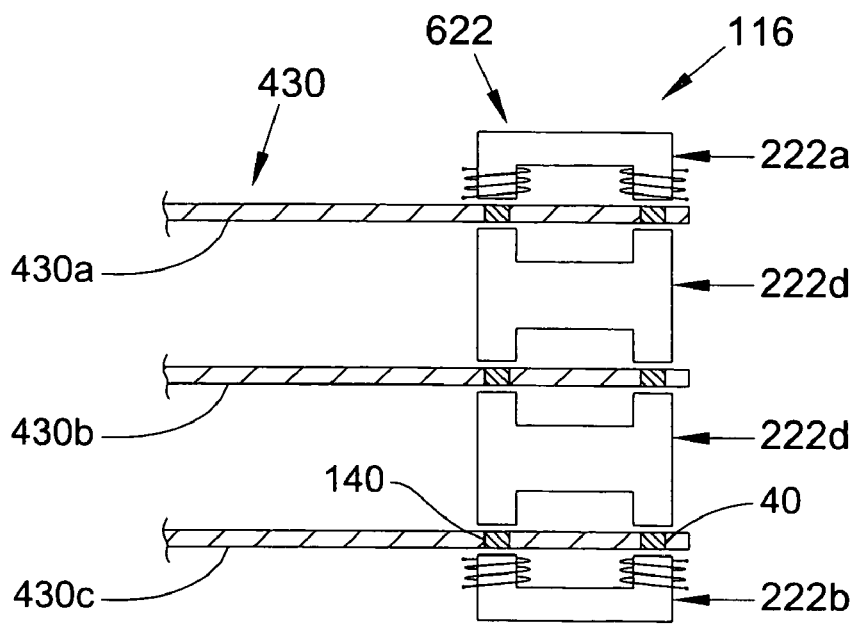
FIG. 22 is a side cross-sectional view of another electromechanical machine comprising a stacked-rotor and a poly-gapped electromagnet, in accordance with an embodiment of the present invention.

FIG. 22 is a side cross-sectional view of an electromechanical machine 116 comprising a stacked-rotor 430 and a poly-gapped electromagnet 622, in accordance with an embodiment of the present invention. The stacked-rotor 430 is substantially as provided in FIG. 21. The poly-gapped electromagnet 552 comprises a first half electromagnet 222a and a second half electromagnet 222b, and a plurality of H-type electromagnets 222d there between. The H-type electromagnets 222d provide a closed flux path for each of the permanent magnet pairs 440 independent from the other permanent magnet pairs 440 of the other rotors 430a, 430b, 430c.

The embodiments of the electromechanical machines 114, 116 of FIGS. 21 and 22 can be further modified by the replacement of the straight electromagnet pairs 222c and H-type electromagnets 222d, respectively, with passive magnetic flux guides having a substantially similar configuration.

In general, the addition of more gaps in the magnetic circuit of a toroidal electromagnet requires that the total number of Ampere-turns of the winding be increased to maintain the strength of the magnetic induction in each gap. Since all gaps have the same width measure between opposite faces, the required number of Ampere-turns increases proportionally to the total number of gaps per electromagnet. For example, two gaps per electromagnet require twice the Ampere-turns needed for one gap. Thus, either more turns, more current, or a combination of both will be needed, as will be obvious to those skilled in the art.

In other respects, such as the nature of the commutation waveforms, reversing, and starting, the double-gap and poly-gap embodiments of the electromechanical machine, will behave substantially the same as the single-gap embodiments previously described. The methods of connecting the windings, sensing rotor position, controlling, and the like will be similar to those already described, with obvious modifications due to the additional windings. The ratio of stator period to rotor period will still be given by (N+1)/N, where N is the number of electrical excitation phases.

In other embodiments of the electromagnets, instead of using circular toroidal cores with a gap, a square core as shown in FIG. 18 can be used. A square core allows for more convenient concentration of windings 28 near the gap 23. The concentration of windings 28 near the gap 23 increases the maximum unsaturated magnetic induction in the gap and reduces the lateral extent of the fringe fields. For a particular square core, the difference in core length between inner and outer "circumferences" is smaller than for a round C-core with the same gap and pole face size. This also tends to increase magnetic flux by delaying the onset of saturation along the inner circumference where saturation begins first due to the higher magnetic field there. These changes further increase the torque and force.

Another application where an electromagnetic machine comprising a multi-ring rotor and double-gap electromagnet is desired is in stepper motor applications. Stepper motor embodiments of the electromechanical machine, in accordance with the present invention, provide much higher performance than conventional stepper motors. In accordance with the present invention, a larger volume is available for the windings which allows substantial reduction of resistive electrical losses. The substantial reduction of resistive electrical losses, in combination with the benefits of the double-ring or multi-double ring embodiments, provide substantially larger stepping and holding torques over currently available stepper motors.

Although the invention has been described in conjunction with specific embodiments, it is evident that many substitutions, alternatives and variations will be apparent to those skilled in the art in light of the foregoing description. Accordingly, the present invention is intended to embrace all of the alternatives and variations that fall within the spirit and scope of the appended claims. For example, it should be understood that, in accordance with the various alternative embodiments described herein, various systems and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the embodiments may be used in various subcombinations to achieve at least certain of the benefits and attributes described herein, and such subcombinations also are within the scope of the present invention. All such refinements, enhancements and further uses of the present invention are within the scope of the present invention.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An electromechanical machine comprising:
   a stator including at least one stator module having a plurality of toroid-shaped electromagnets, each of the electromagnets defining a first gap and a second gap, wherein each of the electromagnets are arranged along an arc a predetermined distance apart defining a stator module arc length; and
   a rotor including a disc having a first ring of permanent magnets of a predetermined number and a second ring of permanent magnets of the same predetermined number, the rotor defining an axis of rotation, the first ring is coaxial with and arranged about a periphery of the disk, the second ring is coaxial with and of a smaller diameter as the first ring of permanent magnets, the plurality of permanent magnets of each ring spaced side by side and arranged so as to have alternating north-south polarities, the rotor adapted to pass the first ring of permanent magnets through the first gap and the second ring of permanent magnets through the second gap of the electromagnets, the permanent magnets being sized and spaced such that within the stator module arc length the ratio of permanent magnets to electromagnets is N+1 to N, where N equals a number of electrical excitation phases applied to the electromagnets.

2. The electromechanical machine of claim 1, wherein the ratio of permanent magnets to electromagnets is based on a relationship of three to two wherein the electromechanical machine is driven as a two-phase machine.

3. The electromechanical machine of claim 2, further comprising Hall-effect sensors positioned on the at least one stator module and adapted to provide timing signals for controlling the selective energizing of the electromagnets.

4. The electromechanical machine of claim 2, wherein the electromagnets are selectively energized so as to provide four repeating commutation intervals.

5. The electromechanical machine of claim 1, wherein a control module controls the electromechanical machine to operate as a motor in a first mode of operation and to operate as a generator in a second mode of operation.

6. The electromechanical machine of claim 1, wherein a control module controls the electromechanical machine to operate as a generator.

7. The electromechanical machine of claim 1, wherein when operating as a motor the electromotive machine is self-starting.

8. The electromechanical machine of claim 1, wherein a control module controls the electromechanical machine to operate as a motor.

9. The electromechanical machine of claim 1, wherein the electromagnets are selectively energized so as to provide 2 times N repeating commutation intervals.

10. An electromechanical machine comprising:
   a stator including at least one stator module having a plurality of electromagnets, each of the electromagnets defining a first gap and a second gap, wherein each of the electromagnets are arranged along an arc a predetermined distance apart defining a stator module arc length; and
   a rotor including a disc having a first ring of permanent magnets of a predetermined number and a second ring of permanent magnets of the same predetermined number, the rotor defining an axis of rotation, the first ring is coaxial with the axis of rotation, the second ring is coaxial with and of a smaller diameter as the first ring of permanent magnets, the plurality of permanent magnets of each ring spaced apart side by side and arranged so as to have alternating north-south polarities, the rotor operable to pass the first ring of permanent magnets through the first gap and pass the second ring of permanent magnets through the second gap, the permanent magnets being sized and spaced such that within the stator module arc length the ratio of permanent magnets to electromagnets is N+1 to N, where N equals a number of electrical excitation phases to which the electromagnets are configured.

11. The electromechanical machine of claim 10, wherein the ratio of permanent magnets to electromagnets is based on a relationship of three to two wherein the electromechanical machine is driven as a two-phase machine.

12. The electromechanical machine of claim 11, further comprising Hall-effect sensors positioned on the at least one stator module and adapted to provide timing signals for controlling the selective energizing of the electromagnets.

13. The electromechanical machine of claim 11, wherein the electromagnets are selectively energized so as to provide four repeating commutation intervals.

14. The electromechanical machine of claim 10, wherein a control module controls the electromechanical machine to operate as a motor in a first mode of operation and to operate as a generator in a second mode of operation.

15. The electromechanical machine of claim 10, wherein a control module controls the electromechanical machine to operate as a generator.

16. The electromechanical machine of claim 10, wherein when operating as a motor the electromotive machine is self-starting.

17. The electromechanical machine of claim 10, wherein a control module controls the electromechanical machine to operate as a motor.

18. The electromechanical machine of claim 10, wherein the electromagnets are selectively energized so as to provide 2 times N repeating commutation intervals.

19. An electromechanical machine comprising:
   a stator including at least one stator module having a plurality of electromagnets, each of the electromagnets defining a first gap and a second gap, wherein each of the electromagnets are arranged along an arc a predetermined distance apart defining a stator module arc length; and
   a rotor including a disc having a first ring of permanent magnets of a predetermined number and a second ring of permanent magnets of the same predetermined number, the rotor defining an axis of rotation, the first ring is coaxial with the axis of rotation, the second ring is coaxial with and of a smaller diameter as the first ring of permanent magnets, the plurality of permanent magnets of each ring spaced apart side by side, the rotor arranged to pass the first ring of permanent magnets through the first gap and the second ring of permanent magnets through the second gap, the permanent magnets being sized and spaced such that within the stator module arc length the ratio of permanent magnets to electromagnets is N+1 to N, where N equals a number of electrical excitation phases to which the electromagnets are configured.

* * * * *